United States Patent
Williams et al.

(10) Patent No.: US 8,418,458 B2
(45) Date of Patent: Apr. 16, 2013

(54) TURBOCHARGER CORE

(75) Inventors: Thomas J. Williams, Milford Township, MI (US); Mark E. Suchezky, South Lyon, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 537 days.

(21) Appl. No.: 12/690,767

(22) Filed: Jan. 20, 2010

(65) Prior Publication Data

US 2010/0180592 A1    Jul. 22, 2010

Related U.S. Application Data

(60) Provisional application No. 61/145,791, filed on Jan. 20, 2009.

(51) Int. Cl.
  *F02B 33/44*  (2006.01)
  *F01D 17/16*  (2006.01)
  *F02C 6/12*   (2006.01)

(52) U.S. Cl.
  USPC ........... 60/598; 60/605.2; 60/605.3; 415/112; 415/191; 415/178; 415/208.2; 415/229

(58) Field of Classification Search ............ 60/598, 60/605.2, 605.3; 415/191, 208.2, 229, 178, 415/112
  See application file for complete search history.

(56) References Cited

U.S. PATENT DOCUMENTS

| | | |
|---|---|---|
| 2,425,177 A | 8/1947 | Cronstedt |
| 2,427,244 A | 9/1947 | Warner |
| 2,668,006 A | 2/1954 | Larrecq |
| 3,067,981 A | 12/1962 | Swatman |
| 3,241,813 A | 3/1966 | Von Flue et al. |
| 3,460,806 A | 8/1969 | Vershure, Jr. |
| 3,965,681 A | 6/1976 | Wyczalek et al. |

(Continued)

FOREIGN PATENT DOCUMENTS

| | | |
|---|---|---|
| DE | 10061846 A1 | 6/2002 |
| DE | 102009005013 A1 | 7/2010 |

(Continued)

OTHER PUBLICATIONS

International Search Report and Written Opinion of the International Searching Authority in International Application No. PCT/US2010/021518, May 3, 2010, 12 pages.

(Continued)

*Primary Examiner* — Mary A Davis
(74) *Attorney, Agent, or Firm* — Raggio & Dinnin, P.C.

(57) ABSTRACT

A bearing housing of a rotor shaft support assembly of a turbocharger core mounts to and closes a forward end of a cavity that both receives and discharges exhaust gases of an internal combustion engine. A turbine rotor operatively coupled to a rotor shaft and a compressor rotor of an associated turbocharger rotor assembly rotates within a turbine rotor shroud portion of an associated turbine nozzle cartridge assembly, wherein the rotor shaft is rotationally supported by at least one bearing within the bearing housing. The turbine nozzle cartridge assembly provides for directing exhaust gases from the cavity through a peripheral inlet leading to a plurality of vanes between forward and aft walls, through the turbine rotor shroud portion, and then through a nozzle exhaust portion incorporating an external sealing surface on an aft portion thereof that cooperates with a sealing element where the exhaust gases are discharged from the cavity.

33 Claims, 13 Drawing Sheets

U.S. PATENT DOCUMENTS

| | | | |
|---|---|---|---|
| 4,068,612 A | | 1/1978 | Meiners |
| 4,179,884 A | | 12/1979 | Koeslin |
| 4,380,405 A | | 4/1983 | Kaneki et al. |
| 4,586,336 A | | 5/1986 | Horler |
| 4,639,188 A | | 1/1987 | Swadley |
| 4,704,075 A | | 11/1987 | Johnston et al. |
| 4,721,441 A | * | 1/1988 | Miyashita et al. ............ 417/407 |
| 4,776,168 A | | 10/1988 | Woollenweber |
| 4,815,184 A | | 3/1989 | Johnston et al. |
| 4,907,952 A | | 3/1990 | Inoue et al. |
| 4,979,881 A | | 12/1990 | Gutknecht |
| 4,986,733 A | | 1/1991 | Fleury et al. |
| 5,025,629 A | | 6/1991 | Woollenweber |
| 5,076,766 A | | 12/1991 | Gutknecht |
| 5,161,960 A | | 11/1992 | Smith |
| 5,176,497 A | | 1/1993 | Deacon et al. |
| 5,207,565 A | | 5/1993 | Roessler |
| RE34,276 E | | 6/1993 | Glaser et al. |
| 5,214,920 A | | 6/1993 | Leavesley |
| 5,224,825 A | | 7/1993 | Strang et al. |
| 5,228,786 A | | 7/1993 | Tanimoto et al. |
| 5,239,956 A | | 8/1993 | Keelan et al. |
| 5,340,286 A | | 8/1994 | Kanigowski |
| 5,354,608 A | | 10/1994 | Keelan et al. |
| 5,471,965 A | | 12/1995 | Kapich |
| 5,868,553 A | | 2/1999 | Battig |
| 5,934,868 A | | 8/1999 | Battig et al. |
| 5,938,402 A | | 8/1999 | Bochud et al. |
| 5,967,762 A | | 10/1999 | Keller et al. |
| 6,168,375 B1 | * | 1/2001 | LaRue et al. ................. 415/146 |
| 6,220,031 B1 | | 4/2001 | Daudel et al. |
| 6,220,829 B1 | | 4/2001 | Thompson et al. |
| 6,250,897 B1 | * | 6/2001 | Thompson et al. ............ 417/407 |
| 6,251,498 B1 | | 6/2001 | Fukushima et al. |
| 6,256,990 B1 | | 7/2001 | Itoh |
| 6,287,091 B1 | | 9/2001 | Svihla et al. |
| 6,318,961 B1 | | 11/2001 | Phillipsen |
| 6,499,884 B1 | | 12/2002 | Svihla et al. |
| 6,553,762 B2 | | 4/2003 | Loffler et al. |
| 6,571,557 B2 | | 6/2003 | DiMarco |
| 6,619,275 B2 | | 9/2003 | Wiik |
| 6,739,845 B2 | | 5/2004 | Woollenweber |
| 6,951,450 B1 | | 10/2005 | Figura |
| 7,089,737 B2 | | 8/2006 | Claus |
| 7,478,991 B2 | | 1/2009 | Noelle |
| 7,553,127 B2 | | 6/2009 | Noelle |
| 7,559,199 B2 | | 7/2009 | Sausse et al. |
| 2006/0150618 A1 | * | 7/2006 | Lehmann et al. ............... 60/289 |
| 2006/0236694 A1 | | 10/2006 | Aguilar |
| 2006/0236695 A1 | | 10/2006 | Aguilar |
| 2007/0113550 A1 | | 5/2007 | Sausse et al. |
| 2007/0130943 A1 | | 6/2007 | Sausse et al. |
| 2007/0154126 A1 | | 7/2007 | Ito |
| 2007/0193268 A1 | | 8/2007 | Noelle et al. |
| 2007/0214785 A1 | | 9/2007 | Giselmo et al. |
| 2008/0098735 A1 | | 5/2008 | Gutknecht |
| 2008/0193281 A1 | | 8/2008 | Sausse et al. |
| 2009/0003994 A1 | | 1/2009 | Petitjean et al. |
| 2009/0003995 A1 | | 1/2009 | Petitjean et al. |
| 2009/0126659 A1 | | 5/2009 | Lester et al. |
| 2009/0151327 A1 | | 6/2009 | Zimmermann |
| 2009/0196743 A1 | | 8/2009 | Ueno et al. |
| 2009/0249774 A1 | | 10/2009 | Sloss et al. |
| 2010/0180592 A1 | | 7/2010 | Williams et al. |

FOREIGN PATENT DOCUMENTS

| | | |
|---|---|---|
| EP | 0103260 A2 | 3/1984 |
| EP | 0118051 B1 | 2/1988 |
| EP | 0191380 B1 | 10/1989 |
| EP | 0982482 A2 | 3/2000 |
| EP | 1860284 A1 | 11/2007 |
| JP | 2002303145 A | 10/2002 |
| WO | 2007111759 A2 | 10/2007 |
| WO | 2008015583 A1 | 2/2008 |
| WO | 2008036862 A2 | 3/2008 |
| WO | 2010085494 A1 | 7/2010 |

OTHER PUBLICATIONS

Levine, Mike, "First Look: Ford's All-New 6.7-Liter V-8 Power Stroke Diesel Engine," Internet document downloaded from http://news.pickuptrucks.com/2009/08/first-look-fords-new-6-7-liter-v-8-scorpion-power-stroke-diesel-engine.html, Aug. 30, 2009, 21 pp.

International Search Report and Written Opinion of the International Searching Authority in International Application No. PCT/US2012/0343925, Oct. 9, 2012, 14 pages.

* cited by examiner

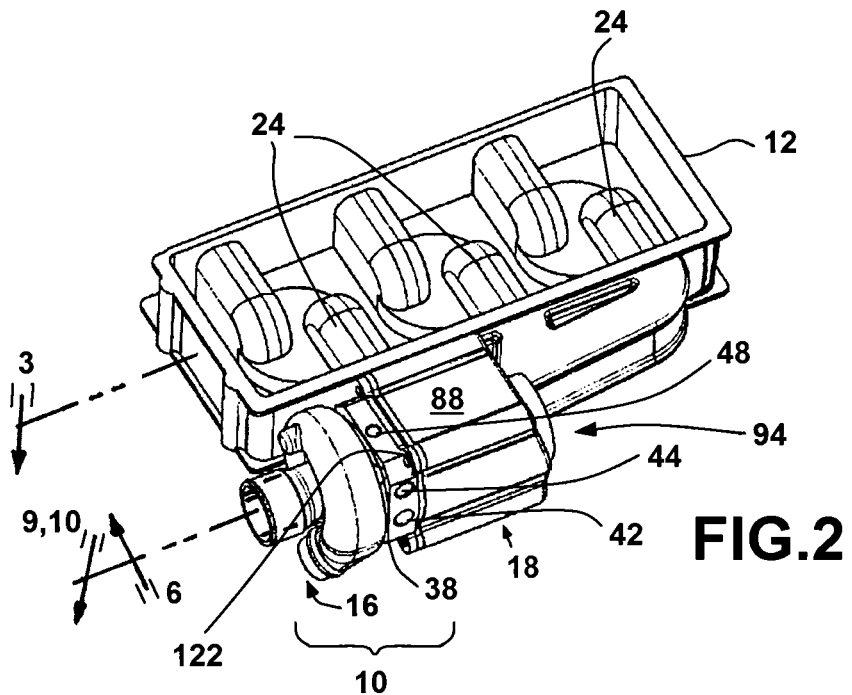
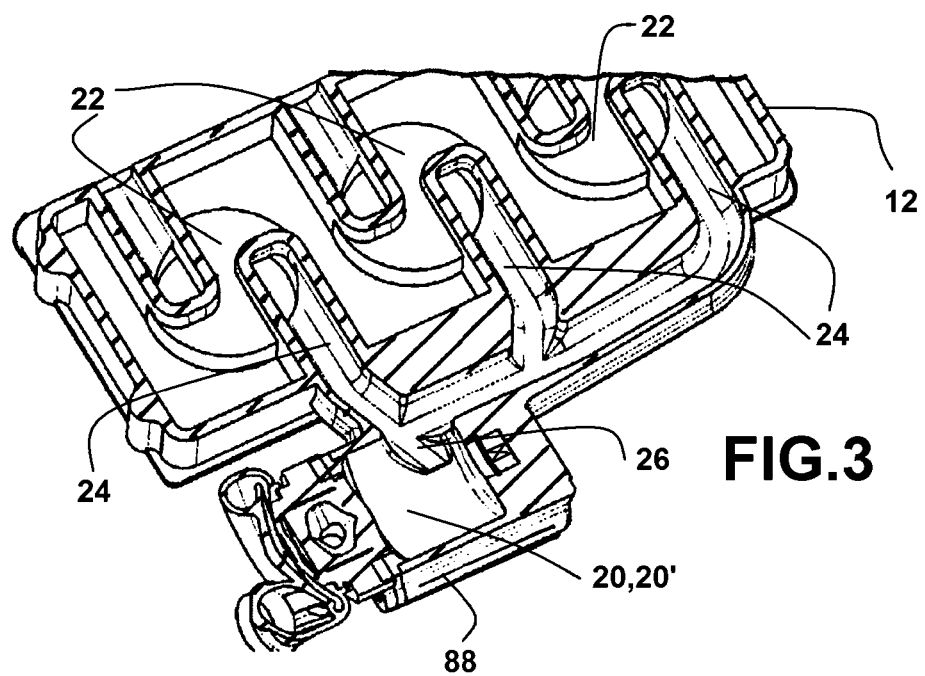

TURBOCHARGER CORE

CROSS-REFERENCE TO RELATED APPLICATIONS

The instant application claims the benefit of prior U.S. Provisional Application Ser. No. 61/145,791 filed on 20 Jan. 2009, which is incorporated by reference herein in its entirety.

BRIEF DESCRIPTION OF THE DRAWINGS

In the accompanying drawings:

FIG. 2 illustrates an isometric view of a cylinder head and turbocharger core from the first aspect of an internal combustion engine illustrated in FIG. 1;

FIG. 3 illustrates first cross-sectional view through the cylinder head and turbocharger core illustrated in FIG. 2;

DESCRIPTION OF EMBODIMENT(S)

Figure 1:
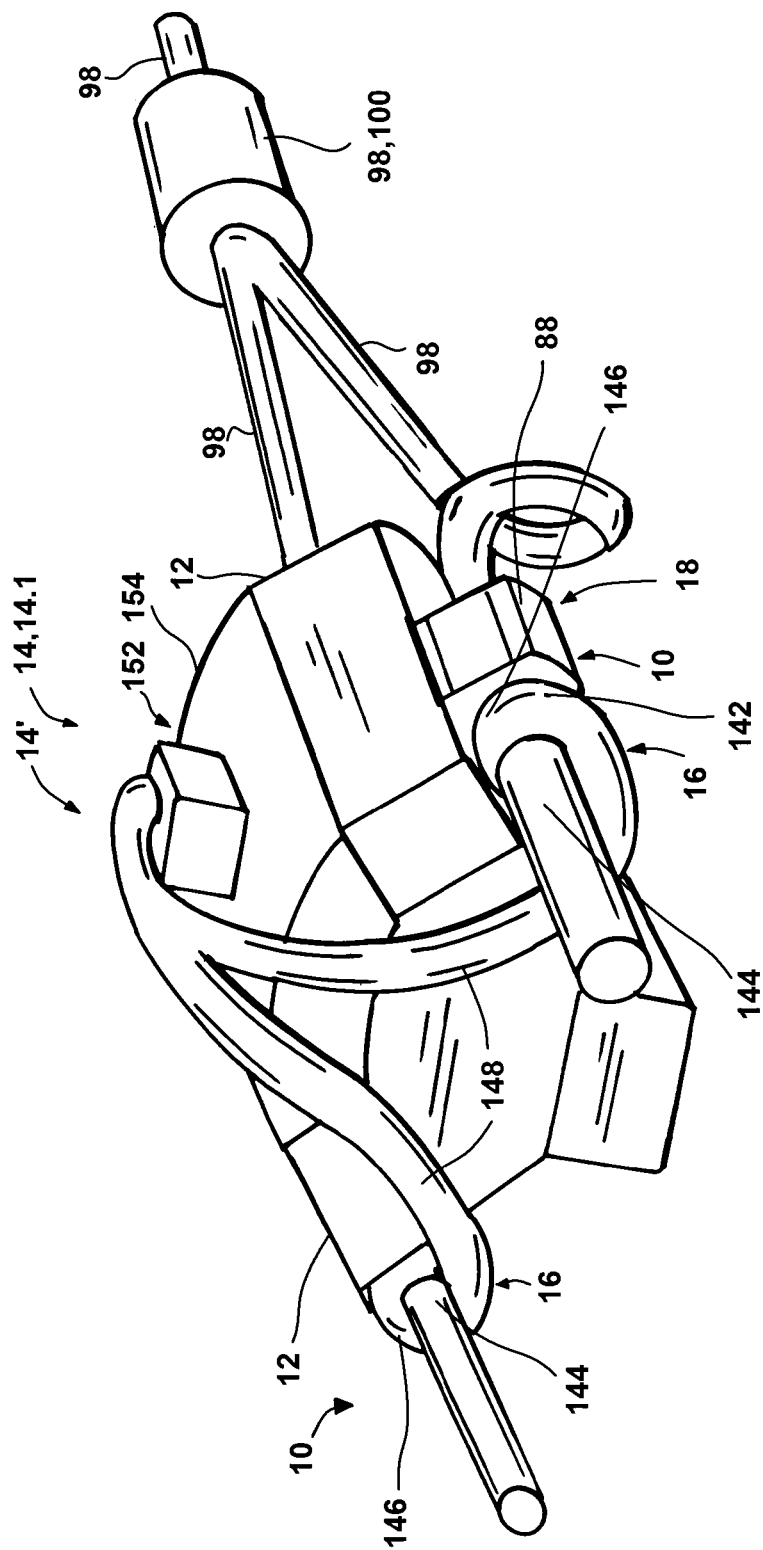
FIG. 1 illustrates an isometric view of a first aspect of an internal combustion engine comprising a pair of cylinder heads and a corresponding pair of turbocharger cores integrated therewith.
Figure 4:
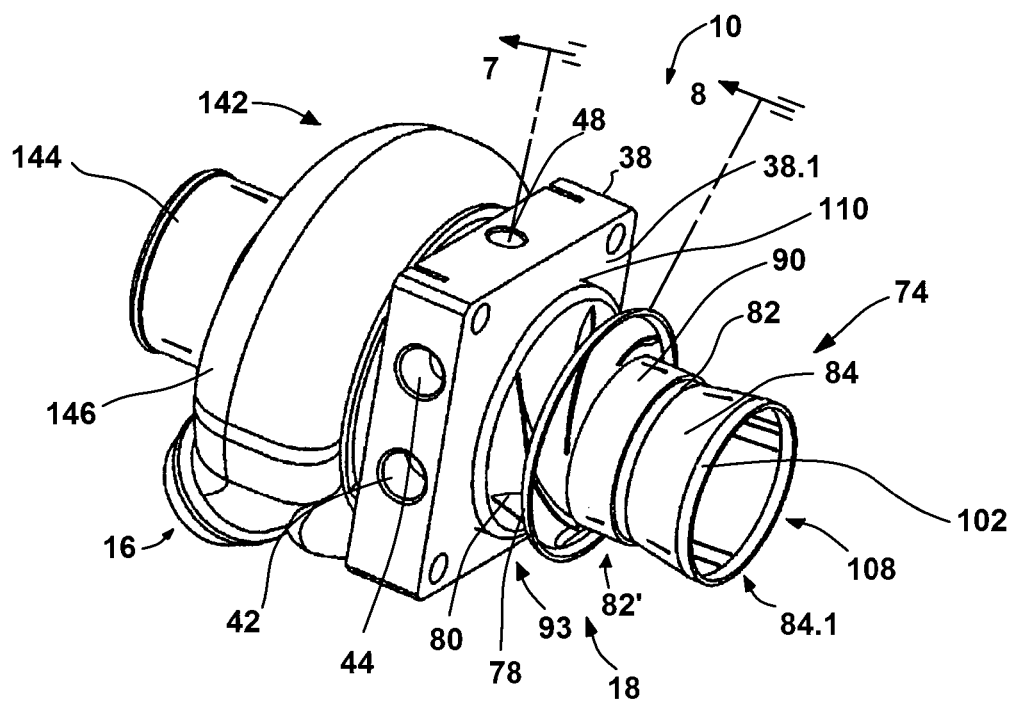
FIG. 4 illustrates an isometric view of the turbocharger core as used in the embodiments illustrated in FIGS. 1-3.
Figure 5:
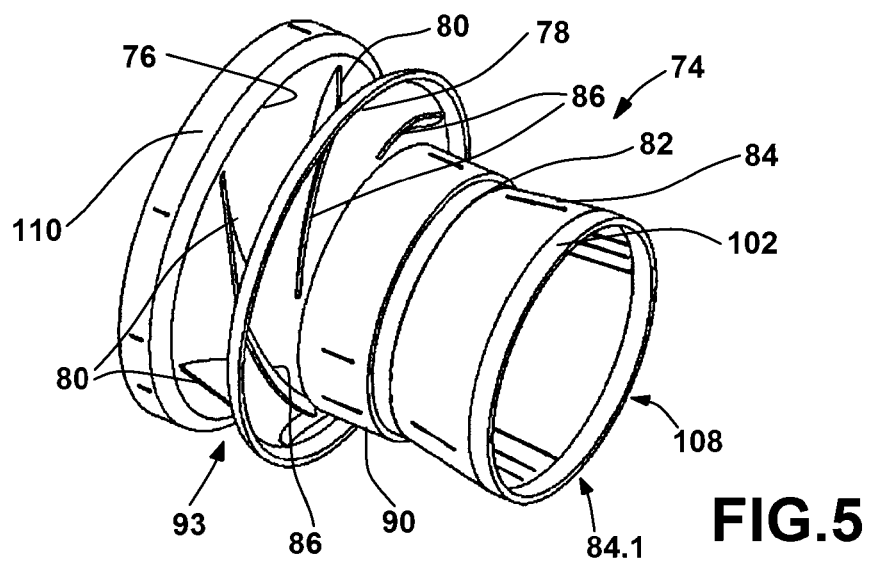
FIG. 5 illustrates an isometric view of a nozzle cartridge assembly from the turbocharger core illustrated in FIG. 2.
Figure 6:
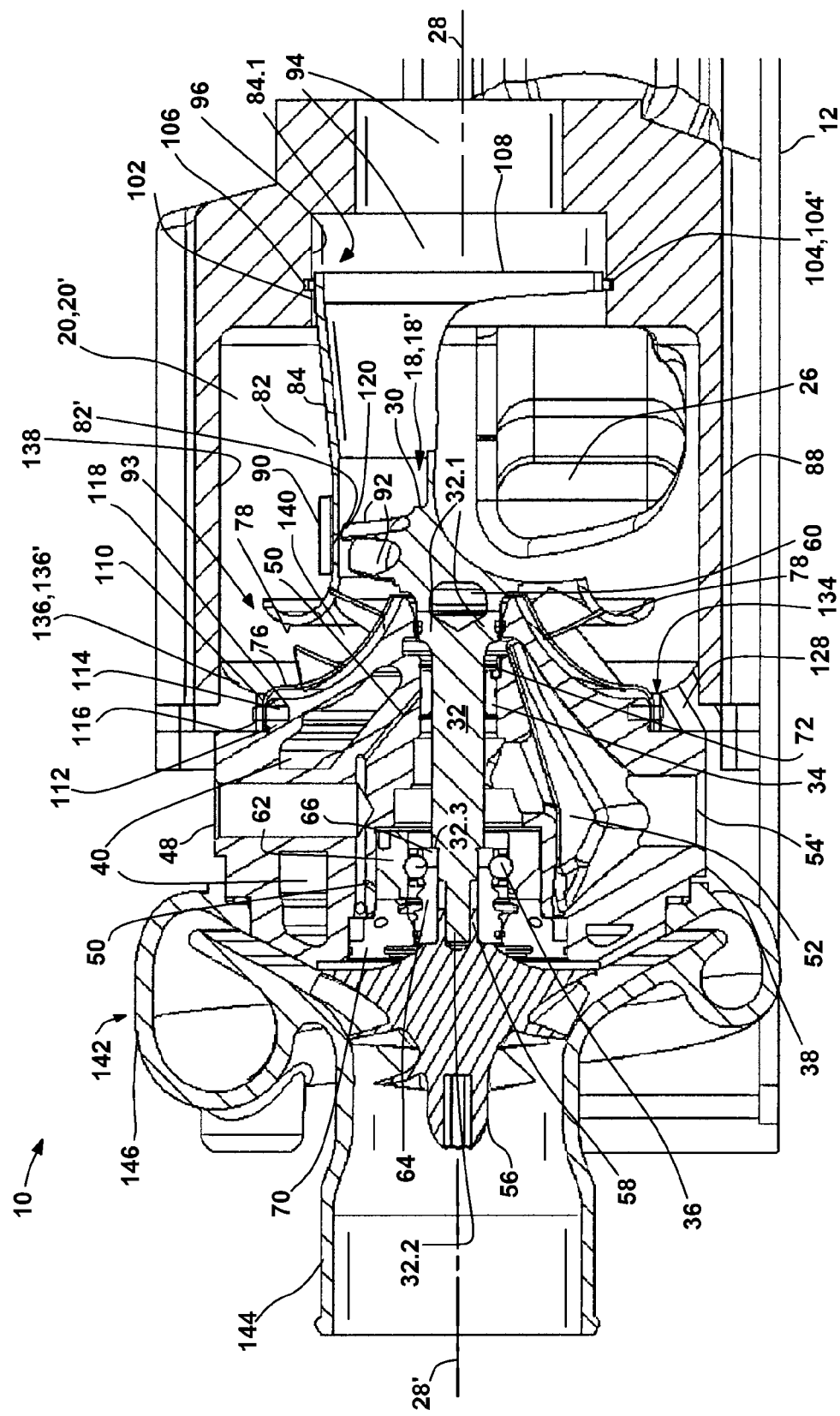
FIG. 6 illustrates a second cross-sectional view through the cylinder head and turbocharger core illustrated in FIG. 2.
Figure 7:
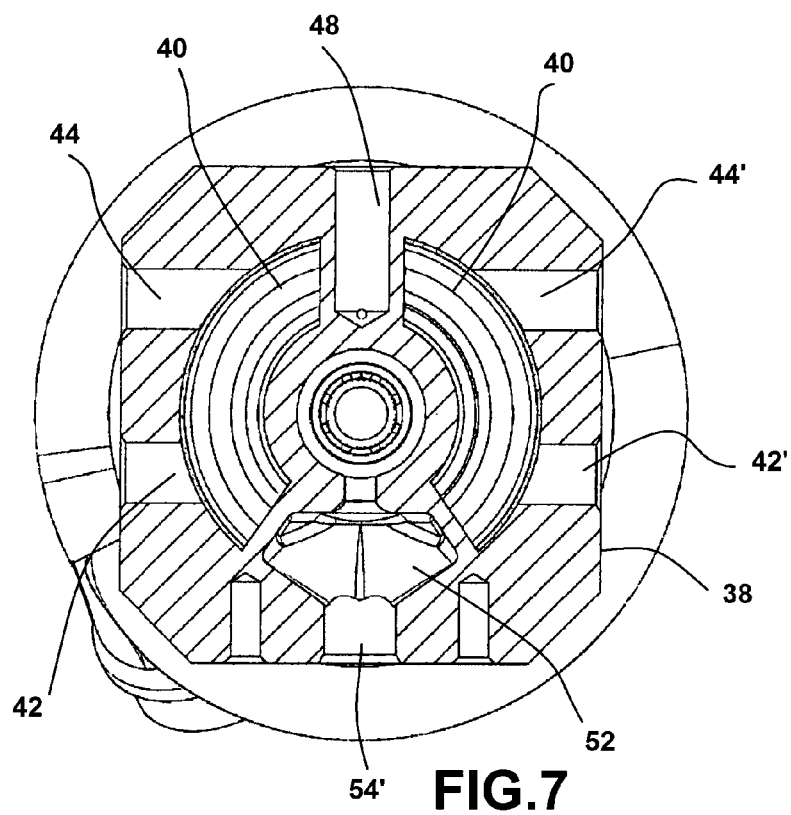
FIG. 7 illustrates a transverse cross-sectional view through a turbine nozzle portion of the turbocharger core illustrated in FIG. 4.
Figure 8:
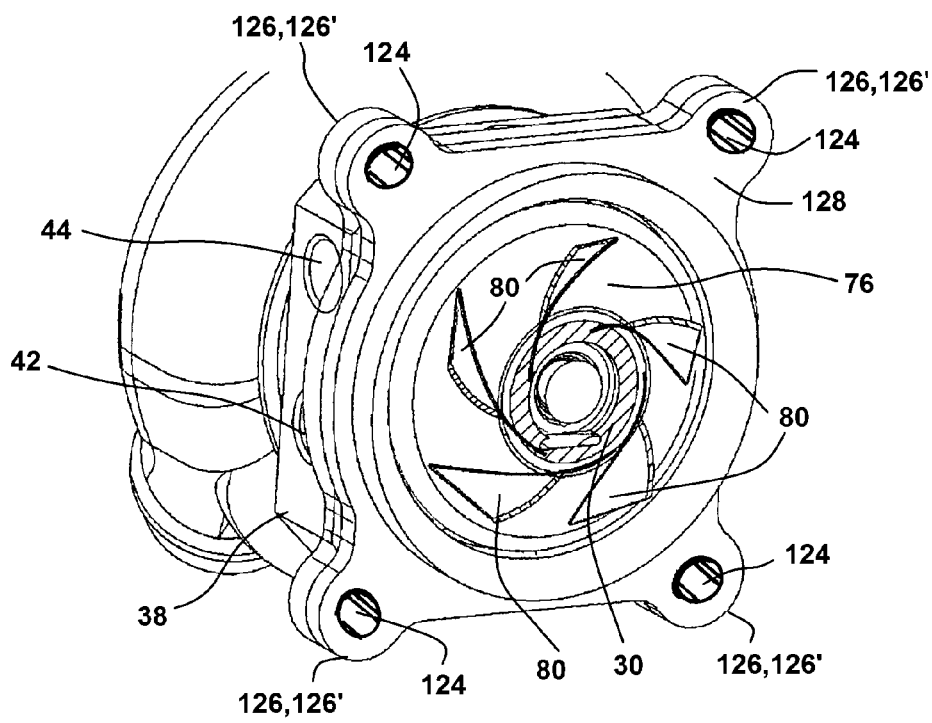
FIG. 8 illustrates a transverse cross-sectional view through a bearing housing portion of the turbocharger core illustrated in FIG. 4.
Figure 9:
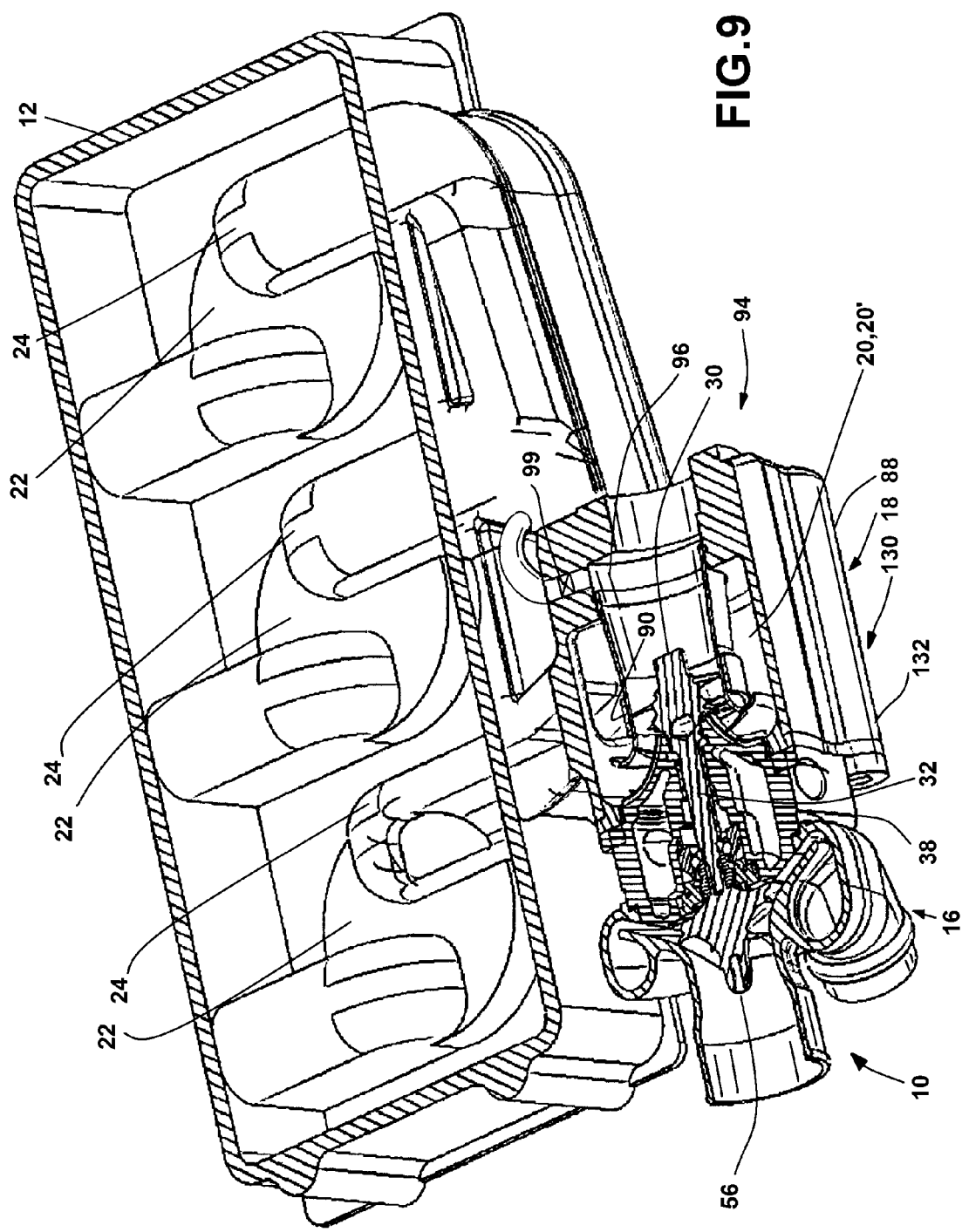
FIG. 9 illustrates third cross-sectional view through the cylinder head and turbocharger core illustrated in FIG. 2.
Figure 10:
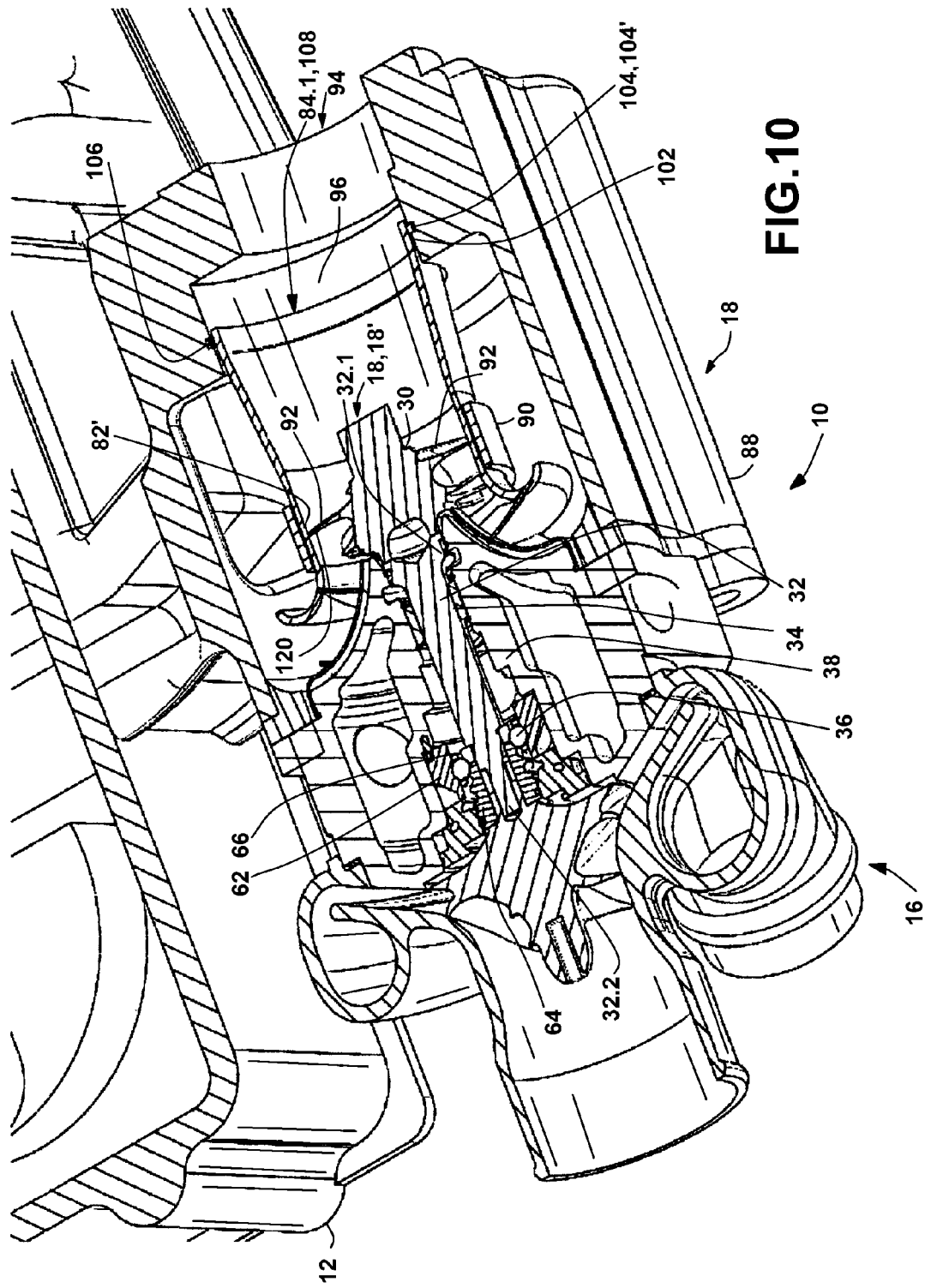
FIG. 10 illustrates an expanded view of a portion of the third cross-sectional view through the cylinder head and turbocharger core illustrated in FIG. 9.

Referring to FIG. 1, a pair of turbocharger cores 10 are integrated with a corresponding pair of cylinder head assemblies 12 of a first aspect of an internal combustion engine 14, 14.1 of a V-type configuration, for example, a V-6 internal combustion engine 14, 14.1'. For example, the internal combustion engine 14, 14.1 can be any of a variety of designs operating on one or more of a variety of types of fuels, including but not limited to gasoline, diesel, bio-diesel, natural gas, including LNG and CNG, propane including LP gas, ethanol or methanol, in accordance with any one of a variety of thermodynamic cycles, including, but not limited to, for example, the Otto cycle, the Diesel cycle, the Atkinson cycle, the Miller cycle or a two-stroke cycle. Referring also to FIGS. 2-10, each turbocharger core 10 comprises a compressor 16 driven by an exhaust-powered turbine 18, wherein when the turbocharger core 10 is attached to the internal combustion engine 14, 14.1, for example, through an intercooler, each associated turbine 18 is inserted in and cooperates with a cavity 20, for example, a cylindrical cavity 20' or a volute cavity 20", in the corresponding cylinder head assembly 12 adapted to receive exhaust gases 21 from the associated cylinder or cylinders 22 associated therewith via associated exhaust runners 24. For example, the turbocharger core 10 incorporates an axial-flow turbine 18', which can be configured with a relatively low associated moment of inertia so as to provide for a relatively rapid dynamic response to changes in the associated operating condition of the internal combustion engine 14, 14.1. In the first aspect of the internal combustion engine 14, 14.1, the exhaust runners 24 from each cylinder 22 communicate with a common first exhaust port 26 in the side of the cavity 20 at a location off-axis relative to the central axis 28 of the cavity 20 so as to induce a circulation of the exhaust gases 21 flowing thereinto.

The turbocharger core 10 comprises a turbine rotor 30 of a turbocharger rotor assembly operatively coupled to an aft end 32.1 of a rotor shaft 32 of the turbocharger rotor assembly that is rotationally supported by rotor shaft support assembly comprising an aft journal bearing 34 and a forward rolling element bearing 36 located within an associated bearing housing 38 and spaced apart from one another along the alternatively. The bearing housing 38 incorporates a cooling jacket 40 therewithin in fluid communication with inlet 42 and outlet 44 ports that are adapted to receive a flow of cooling water from the water cooling system 46 of the internal combustion engine 14, 14.1 and thereby provide for cooling the aft journal bearing 34 and the forward rolling element bearing 36, wherein one set of inlet 42 and outlet 44 ports is used for one side of the internal combustion engine 14, 14.1, and the other one set of inlet 42' and outlet 44' ports is used for the other side of the internal combustion engine 14, 14.1, with the unused set of inlet 42', 42 and outlet 44', 44 ports on either side being plugged. An oil inlet port 48 is adapted to receive a supply of pressurized engine oil from an oil pump of the internal combustion engine 14, 14.1 and distribute this oil to the aft journal bearing 34 and the forward rolling element bearing 36 via associated oil distribution passages 50. Oil draining from aft journal bearing 34 and the forward rolling element bearing 36 is gravity collected in an oil scavenge cavity 52 within the base of the bearing housing 38, and is returned to the internal combustion engine 14, 14.1 via an associated oil scavenge line 54 (illustrated in FIG. 13) connected to an associated oil scavenge port 54' at the base of the bearing housing 38.

It should be understood that the rotor shaft support assembly is not limited to the combination of an aft journal bearing 34 and a forward rolling element bearing 36, but the rotor shaft support assembly could alternatively comprise any combination of journal and rolling element bearings, or conceivably a single extended-length journal bearing.

The compressor 16 of the turbocharger core 10 comprises a compressor rotor 56 of the turbocharger rotor assembly operatively coupled to the forward end 32.2 of the rotor shaft 32 and adapted to rotate therewith about a central axis 28' of the turbocharger core 10, which is substantially aligned with the central axis 28 of the cavity 20. For example, in one embodiment, the compressor rotor 56—in accordance with what is known as a boreless hub,—incorporates an aftward extending internally threaded boss 58 that threads onto the forward end 32.2 of the rotor shaft 32, and the turbine rotor 30 is welded to the aft end 32.1 of the rotor shaft 32 along the periphery of a cavity 60 between the forward end of the turbine rotor 30 and the aft end 32.1 of the rotor shaft 32 that provides for reducing heat transfer from the turbine rotor 30 to the rotor shaft 32. The forward rolling element bearing 36 comprises an outer race 62 and forward 64 and aft 66 inner races located on the rotor shaft 32 between a shoulder 32.3 and the compressor rotor 56, which provides for positioning the rotor shaft 32 within the bearing housing 38. The bearing housing 38 incorporates forward 70 and aft 72 seals that provide for preventing leakage of oil from the bearing housing 38 into either the turbine 18 or compressor 16 of the turbocharger core 10.

Referring to FIGS. 4, 5 6 and 8-10, the turbocharger core 10 further comprises a turbine nozzle cartridge assembly 74 operatively coupled to the aft side 38.1 of the bearing housing 38. The turbine nozzle cartridge assembly 74 comprises a forward nozzle wall 76, an aft nozzle wall 78 aftwardly separated therefrom, a plurality of vanes 80 disposed between the forward 76 and aft 78 nozzle walls, a turbine rotor shroud portion 82 extending aftward from the aft nozzle wall 78, and a nozzle exhaust portion 84 extending aftward from the throat portion 82. Although the nozzle exhaust portion 84 is illustrated with a relatively expanded diameter so as to provide for at least partially diffusing the associated exhaust gases, the nozzle exhaust portion 84 need not necessarily be relatively expanded in diameter relative to the associated turbine rotor shroud portion 82.

For example, in one embodiment, the forward nozzle wall 76 is formed as a first sheet metal element and the combination of the aft nozzle wall 78 and turbine rotor shroud 82 and nozzle exhaust 84 portions is formed as a second sheet metal element,—for example, each by stamping or spinning;—and the vanes 80 are each formed from sheet metal—, for example, by stamping,—and inserted in and then welded or brazed to a plurality of corresponding slots 86 in each of the forward 76 and aft 78 nozzle walls. In another embodiment, the aft nozzle wall 78, the turbine rotor shroud portion 82 and the nozzle exhaust portion 84 are each formed from two or more separate sheet metal pieces that that are then joined together, for example, by welding, brazing and/or by press-fitting. Alternatively, the turbine nozzle cartridge assembly 74 may be cast or sintered, for example, laser sintered. The turbine nozzle cartridge assembly 74 is constructed of a material that can withstand high temperature exhaust gases 21, for example, of a nickel alloy, for example, stainless steel with a relatively high nickel content, for example, 310 stainless steel, that provides for high temperature oxidation resistance and strength. The remainder of the turbocharger core 10—being either water- or oil-cooled,—can be constructed of less exotic and more economical materials, such as aluminum or cast iron. For example, in addition to the water-cooled bearing housing 38, the cylinder head assembly 12 may be adapted with water cooling passages in thermal communication with the exhaust housing portion 88 thereof so as to provide using relatively low-cost materials, such as aluminum, for the construction thereof. Accordingly, the separate turbine nozzle cartridge assembly 74 of the turbocharger core 10 provides for an overall more economical use of high-temperature-tolerant materials—for example, limited to the turbine nozzle cartridge assembly 74—than would otherwise be possible, and also provides for integrating the turbocharger core 10 into the cylinder head assembly 12. For example, the combined amount of raw material needed to make the turbine nozzle cartridge assembly 74 and the relatively more simple associated exhaust housing portion 88 of the cylinder head assembly 12 would be less than the amount of material needed to make an equivalent conventional turbocharger exhaust housing.

In yet another embodiment, the turbine rotor shroud portion 82 of the turbine nozzle cartridge assembly 74 is reinforced with a containment sleeve 90 that provides for containing the turbine rotor 30 in the event of a failure of the associated turbine blades 92 thereof.

The turbine nozzle cartridge assembly 74 extends through the cavity 20, 20', 20" in the cylinder head assembly 12. In operation, exhaust gases 21 from the cylinder or cylinders 22 flow through the associated exhaust runners 24 into the first exhaust port 26, i.e. a cavity inlet exhaust port 26, leading into the cavity 20, 20', 20", wherein the off-axis location of the first exhaust port 26 relative to the cavity 20, 20', 20" causes a swirl of the exhaust gases 21 flowing within the cavity 20, 20', 20". The exhaust gases 21 then flow with swirl into the peripheral inlet 93 of the turbine nozzle cartridge assembly 74 along the vanes 80 thereof, and against the turbine blades 92 of the turbine rotor 30, thereby driving the turbine rotor 30 that in turn rotates the rotor shaft 32 and the compressor rotor 56 attached thereto. The exhaust gases 21 then flow through the nozzle exhaust portion 84 of the turbine nozzle cartridge assembly 74 before being exhausted into and through a second exhaust port 94, i.e. a cavity outlet exhaust port 94, that extends from a counterbore 96 in the aft end 20.1 of the cavity 20, 20', 20", wherein the second exhaust port 94 is connected to the engine exhaust system 98, which, for example, may include one or more exhaust treatment devices 100, for example, one or more catalytic converters or mufflers. The cylinder head assembly 12 can incorporate a wastegate valve 99 operative between an exhaust runner 24 and the second exhaust port 94 so as to provide for bypassing exhaust gases 21 directly to the engine exhaust system 98 without first flowing through the turbine nozzle cartridge assembly 74 and associated turbine rotor 30. Accordingly, the forward 76 and aft 78 nozzle walls of the turbine nozzle cartridge assembly 74 redirect and accelerate the circumferentially swirling exhaust gases 21—flowing within the cavity 20, 20', 20" outside of the turbine nozzle cartridge assembly 74—radially inward and axially aftward, and the resulting axially-aftward-flowing swirling exhaust gases 21 then impinge upon the turbine blades 92 of the turbine rotor 30, thereby driving the turbine rotor 30, wherein in one embodiment, the associated vanes 80 in cooperation with the forward 76 and aft 78 nozzle walls are adapted to provide for the proper vector orientation of the impinging exhaust gases 21 relative to the turbine rotor 30 so as to maximize the efficiency of the turbine 18.

The aft end 84.1 of the nozzle exhaust portion 84 of the turbine nozzle cartridge assembly 74 incorporates an external sealing surface 102 that cooperates with a seal ring 104—for example, a piston-ring-type seal ring 104'—located in an internal groove 106 in the counterbore 96 so as to provide for sealing the discharge end 108 of the turbine nozzle cartridge assembly 74 to the exhaust housing portion 88 of the cylinder head assembly 12 so that substantially all of the exhaust gases 21 are discharged from the turbine nozzle cartridge assembly 74 into and through the second exhaust port 94 and into the associated engine exhaust system 98, thereby substantially isolating the exhaust gases 21 in the cavity 20, 20', 20" upstream of the turbine nozzle cartridge assembly 74 from the exhaust gases 21 discharged from the turbine nozzle cartridge assembly 74. The seal ring 104 in cooperation with the external sealing surface 102 provides for enabling discharge end 108 of the turbine nozzle cartridge assembly 74 to both slide in an axial direction and expand or contract in a radial direction, responsive to thermally-induced expansion or contraction thereof, while maintaining the sealing condition at the discharge end 108 of the turbine nozzle cartridge assembly 74, without substantial associated thermally-induced loading of the turbine nozzle cartridge assembly 74.

The forward end 76.2 of the forward nozzle wall 76 comprises a cylindrical lip 110 that fits over a corresponding cylindrical step 112 that extends aftwardly from the aft side 38.1 of the bearing housing 38. The turbine nozzle cartridge assembly 74 is retained on the bearing housing 38 by a plurality of radial pins 114 that extend through corresponding radial holes 116 in the cylindrical lip 110 and into corresponding blind radial holes 118 in the cylindrical step 112. The radial pins 114 and associated radial holes 116, 118 are located symmetrically around the circumferences of the cylindrical lip 110 and the cylindrical step 112. The inside diameter of the cylindrical lip 110 and the outside diameter of the cylindrical step 112 may be adapted so that at ambient temperature, the cylindrical lip 110 has an interference fit with the cylindrical step 112. However, at elevated operating temperatures, the forward nozzle wall 76 and associated cylindrical lip 110 are free to thermally expand relative to cylindrical step 112 responsive to differences in temperature or thermal expansion rates of the forward nozzle wall 76 and bearing housing 38, respectively, in which case, the engagement of the cylindrical lip 110 by the radial pins 114 provides for retaining the turbine nozzle cartridge assembly 74 to the bearing housing 38, and the symmetric arrangement of the associated radial pins 114 and associated radial holes 116, 118 provides for keeping the turbine nozzle cartridge assembly 74 substantially concentric with the central axis 28' of the turbocharger core 10 over the thermal operating range thereof. For example, during normal operation, the turbine nozzle cartridge assembly 74 would heat up relatively more quickly, and to a substantially higher temperature, than the bearing housing 38, and as a result the inside diameter of the cylindrical lip 110 would typically expand so as to be greater than the outside diameter of the cylindrical step 112, so as to transition from a possible interference at ambient temperature to a substantially loose fit at elevated temperatures, under which circumstances, the radial pins 114 would provide for symmetrically and concentrically retaining the cylindrical lip 110 on the cylindrical step 112, so as to preserve the relative alignment of the turbine nozzle cartridge assembly 74 with the associated turbine rotor 30.

Alternatively, the forward end 76.2 of the forward nozzle wall 76 can be centered on the bearing housing 38 with a plurality of aftwardly-extending axial pins or bolts extending from the aft side 38.1 of the bearing housing 38 through corresponding radial slots in the forward end 76.2 of the forward nozzle wall 76, and retained on the bearing housing 38 either by the bolts or by a step in the forward end of the cavity 20.

When the turbine nozzle cartridge assembly 74 is assembled to the bearing housing 38, the turbine blades 92 of the turbine rotor 30 are located within the turbine rotor shroud portion 82 of the turbine nozzle cartridge assembly 74, which turbine rotor shroud portion 82 accordingly functions as a turbine tip shroud 82', wherein the inside diameter of the turbine tip shroud 82' is adapted to provide for about 0.01 inch of clearance to the tips 120 of the turbine blades 92, which relatively tight tolerance provides for improved efficiency of the turbine 18 that might otherwise be possible had the clearance been larger. Accordingly, with the turbine tip shroud 82' a part the turbine nozzle cartridge assembly 74 that is retained on the bearing housing 38 and free to float within the counterbore 96 in the cavity 20, 20', 20", the turbine tip shroud 82' is unaffected by the exhaust housing portion 88 of the cylinder head assembly 12, for example, by thermally-induced stresses therein or therefrom, or external mechanical loads thereto, that might otherwise result in interference with the tip 120 of the turbine blades 92, so that a relatively small clearance between the turbine tip shroud 82' and the tip 120 of the turbine blades 92 can be readily realized using production hardware and processes.

The turbocharger core 10 is assembled to the cylinder head assembly 12 with a plurality of bolts 122 through a corresponding plurality of holes 124 in an associated flange 126 or set of flanges 126' of or extending from the bearing housing 38, through an adapter bushing 128, and into corresponding threaded holes 130 in the forward portion 132 of the exhaust housing portion 88 of cylinder head assembly 12 around the periphery of the of the cavity 20, 20', 20", so that when mounted to the cylinder head assembly 12, the bearing housing 38 of the turbocharger core 10 provides for closing the forward end of the cavity 20, which is sealed at the junction of the bearing housing 38 and adapter bushing 128 and the junction of the adapter bushing 128 and the forward portion 132 of the exhaust housing portion 88 of cylinder head assembly 12 around the periphery of the of the cavity 20, 20', 20" for example, either by mating flat surfaces—as illustrated—or by mating conical surfaces. The inside diameter of the adapter bushing 128 is sufficiently greater that the outside diameter of the cylindrical lip 110 of the forward nozzle wall 76 of the turbine nozzle cartridge assembly 74 so as to provide for uninhibited thermally induced expansion of the cylindrical lip 110 within the gap 134 therebetween, so as to prevent a thermally-induced mechanical stress of the turbine nozzle cartridge assembly 74 that would otherwise occur if the outward radial expansion of the cylindrical lip 110 were otherwise restrained by the adapter bushing 128. The adapter bushing 128 also provides for capturing the radial pins 114 within their radial holes 118 in the cylindrical step 112. The aft surface 136 of the adapter bushing 128 is located and shaped so as to provide for a relatively smooth transition from the inside surface 138 of the cavity 20', 20" to the forward nozzle wall 76 so as to facilitate the flow of exhaust gases 21 from the cavity 20', 20" into the turbine nozzle cartridge assembly 74. For example, in one embodiment, the aft surface 136 of the adapter bushing 128 comprises a portion of a concave toroidal surface 136' that in cross-section provides for a quarter-round fillet between the inside surface 138 and the forward nozzle wall 76. Alternatively, the adapter bushing 128 can be replaced by incorporating the material thereof directly into the exhaust housing portion 88 of the cylinder head assembly 12. Furthermore, alternatively, the turbocharger core 10 may be mounted to the forward portion 132 of the exhaust housing portion 88 of cylinder head assembly 12 with a V-clamp rather than bolts 122.

In operation of the turbocharger core 10, exhaust gases 21 from the first exhaust port 26 are first collected in the annulus 140 defined by portion of the cavity 20, 20', 20" of the exhaust housing portion 88 of the cylinder head assembly 12 on the outside of the turbine nozzle cartridge assembly 74, and then accelerated therefrom by the turbine nozzle cartridge assembly 74 into the turbine blades 92 of the turbine rotor 30. The turbine nozzle cartridge assembly 74 provides for directing and accelerating exhaust flow into the turbine blades 92 of the turbine rotor 30, and controlling the associated mass flow of these exhaust gases 21. Accordingly, the turbine nozzle cartridge assembly 74 can be configured—independent of the design of the cavity 20, 20', 20" or the associated exhaust housing portion 88 of the cylinder head assembly 12, for example, by adjusting the area/radius ratio (A/R) of the passage 140 through the turbine nozzle cartridge assembly 74—so as to adapt to the particular turbocharging requirements of a given internal combustion engine 14, 14.1, which provides for simplifying the process of tuning the turbocharger core 10 to the internal combustion engine 14, 14.1 because the only component to be changed in that process would be the turbine nozzle cartridge assembly 74. For example, in one set of embodiments, the forward 76 and aft 78 nozzle walls comprise corresponding forward 76' and aft 78' curved swept surfaces, the shapes of which may be adapted in cooperation with the associated vanes 80 to provide for tuning the turbocharger core 10.

Responsive to exhaust gases 21 impinging thereupon, the turbine rotor 30 of the turbine 18 of the turbocharger core 10 drives the rotor shaft 32 that rotates in the aft journal bearing 34 and forward rolling element bearing 36 in the bearing housing 38 and in turn drives the compressor rotor 56 that rotates within an associated compressor housing 142 of the associated compressor 16, which provides for compressing air from a central inlet 144 to the compressor housing 142, and discharging the compressed air through a volute diffuser 146 surrounding the compressor rotor 56. The compressed air is discharged from the compressor 16 into a conduit 148 that is coupled to an inlet plenum 150, for example, coupled to or surrounding a throttle body 152 coupled to an inlet manifold 154 of the internal combustion engine 14, 14.1.

Figure 11:
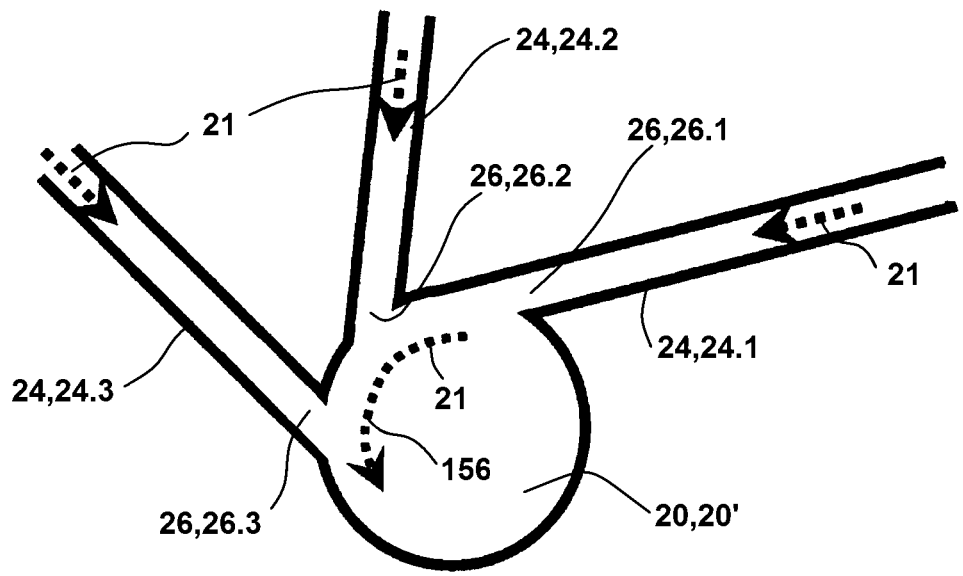
FIG. 11 illustrates a schematic view of a first alternative embodiment of an interface of a plurality of exhaust runners from each of a plurality of cylinders with a cavity in a cylinder head adapted to receive a turbocharger core.
Figure 12:
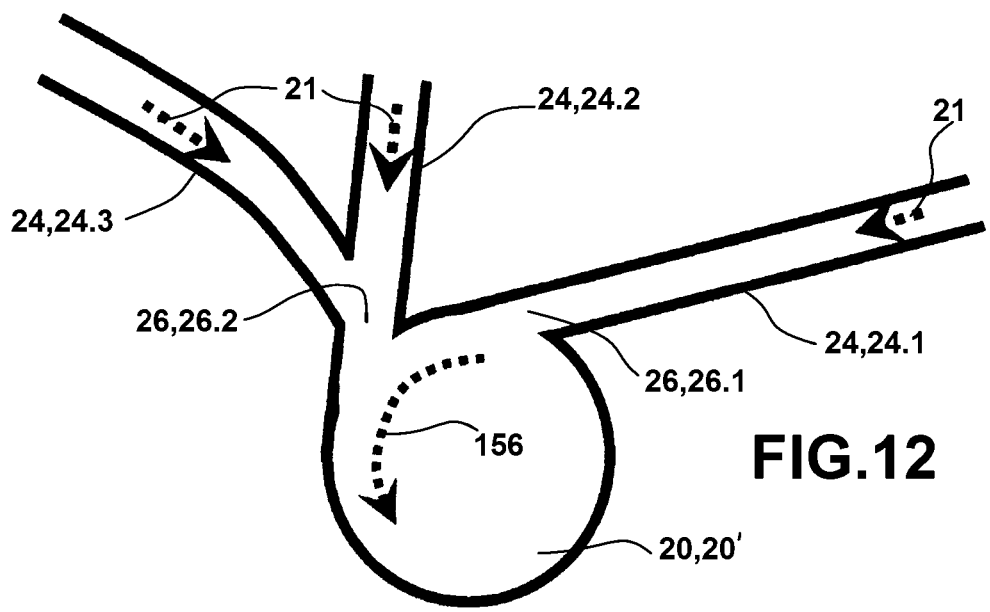
FIG. 12 illustrates a schematic view of a second alternative embodiment of an interface of a plurality of exhaust runners from each of a plurality of cylinders with a cavity in a cylinder head adapted to receive a turbocharger core.

Referring to FIGS. 11 and 12, in accordance with respective first and second alternative embodiments, the cavity 20, 20', 20" of the exhaust housing portion 88 of the cylinder head assembly 12 may be configured to receive exhaust gases 21 from a plurality of first exhaust ports 26, 26.1, 26.2, 26.3, each operatively associated with one or more associated exhaust runners 24, 24.1, 24.2, 24.3, each exhaust runner 24 operatively associated with one or more cylinders 22 of the internal combustion engine 14, 14.1, wherein for each first exhaust port 26, 26.1, 26.2, 26.3, each corresponding associated exhaust runner 24, 24.1, 24.2, 24.3 is oriented so as to introduce exhaust gases 21 substantially tangentially into the cavity 20, 20', 20" so that the resulting flow of exhaust gases 21 in the cavity 20, 20', 20" from each associated first exhaust port 26, 26.1, 26.2, 26.3 swirls in a common swirl direction 156. For example, referring to FIG. 11, in the first alternative embodiment, the cavity 20, 20', 20" is coupled to each of three different cylinders with three different exhaust runners 24, 24.1, 24.2, 24.3, each of which discharges exhaust gases 21 into the cavity 20, 20', 20" through a separate, corresponding first exhaust port 26, 26.1, 26.2, 26.3, wherein the associated exhaust runners 24, 24.1, 24.2, 24.3 are oriented so that all of the first exhaust port 26, 26.1, 26.2, 26.3 discharge exhaust gases 21 tangentially into the cavity 20, 20', 20" in a common swirl direction 156. Furthermore, referring to FIG. 12, in the second alternative embodiment, the cavity 20, 20', 20" is coupled to each of three different cylinders with three different exhaust runners 24, 24.1, 24.2, 24.3, two of which exhaust runners 24, 24.1, 24.2 discharge exhaust gases 21 into the cavity 20, 20', 20" through separate, corresponding first exhaust port 26, 26.1, 26.2, the third of which exhaust runners 24, 24.3 discharges exhaust gases 21 into the second exhaust runner 24, 24.2, which in turn discharges the exhaust gases 21 into the cavity 20, 20', 20" through the second of the plurality of first exhaust ports 26, 26.2, wherein the associated exhaust runners 24, 24.1, 24.2 are oriented so that both the first 24, 24.1 and second 24, 24.2 exhaust ports discharge exhaust gases 21 tangentially into the cavity 20, 20', 20" in a common swirl direction 156.

By incorporating the turbocharger core 10 in the associated cylinder head assembly 12, and providing for water-cooling the bearing housing 38 and the associated exhaust housing portion 88 of the cylinder head assembly 12 that surrounds the associated cavity 20, 20', 20" of the turbocharger core 10, the turbocharger core 10 provides for reducing the amount of high-temperature tolerant material, for example a relatively high nickel content alloy, than would otherwise be required for a corresponding comparable stand-alone turbocharger assembly, which provides for reducing cost in comparison with a stand-alone turbocharger assembly. Furthermore, the incorporation of the turbocharger core 10 in the associated cylinder head assembly 12 provides for more closely coupling the exhaust from the cylinders 22 of the internal combustion engine 14, 14.1 to the turbocharger core 10, which provides for improved efficiency than would otherwise be possible with a corresponding comparable stand-alone turbocharger assembly.

Figure 13:
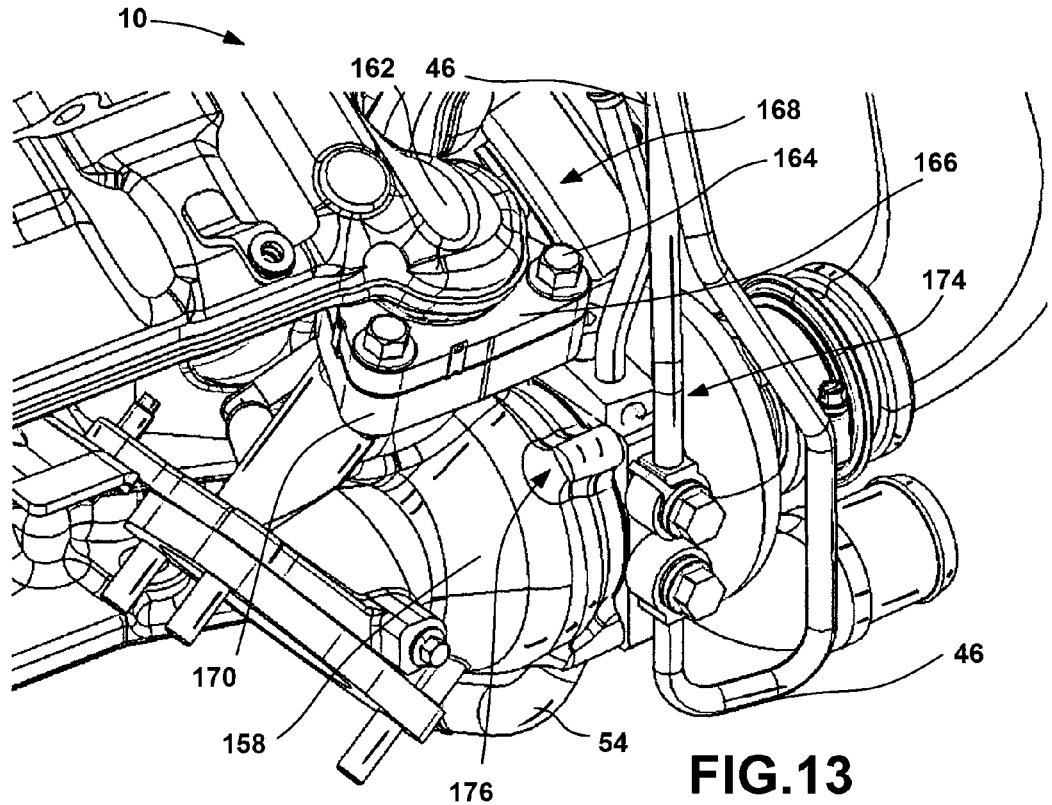
FIG. 13 illustrates an isometric view of a portion of a second aspect of an internal combustion engine incorporating a first embodiment of a turbocharger assembly operatively coupled to an associated exhaust manifold.
Figure 14:
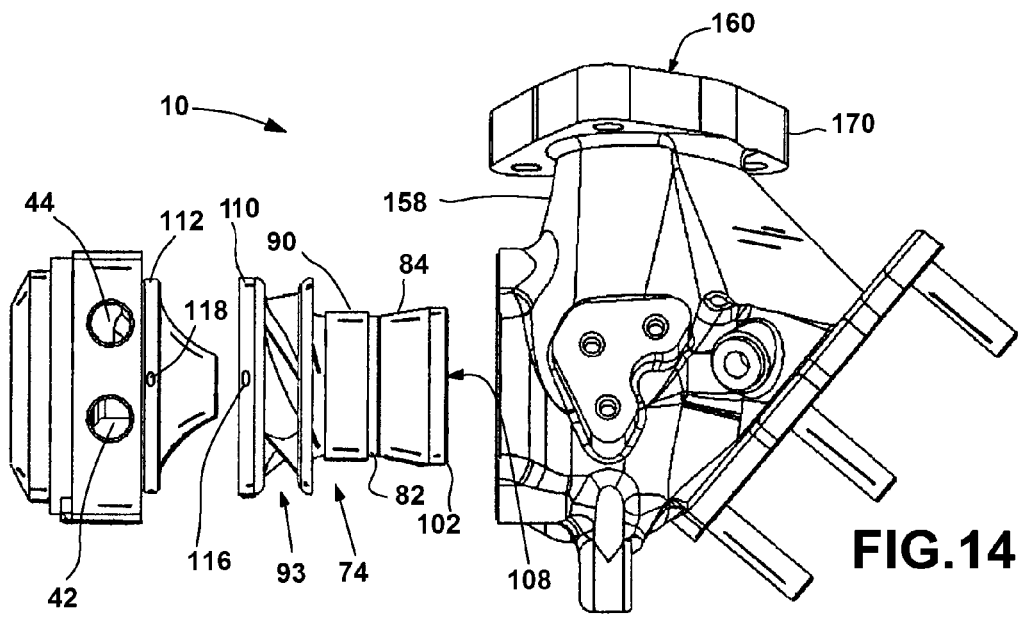
FIG. 14 illustrates an exploded view of portions of the first embodiment of the turbocharger assembly and associated housing used with the second aspect of the internal combustion engine illustrated in FIG. 13.
Figure 15:
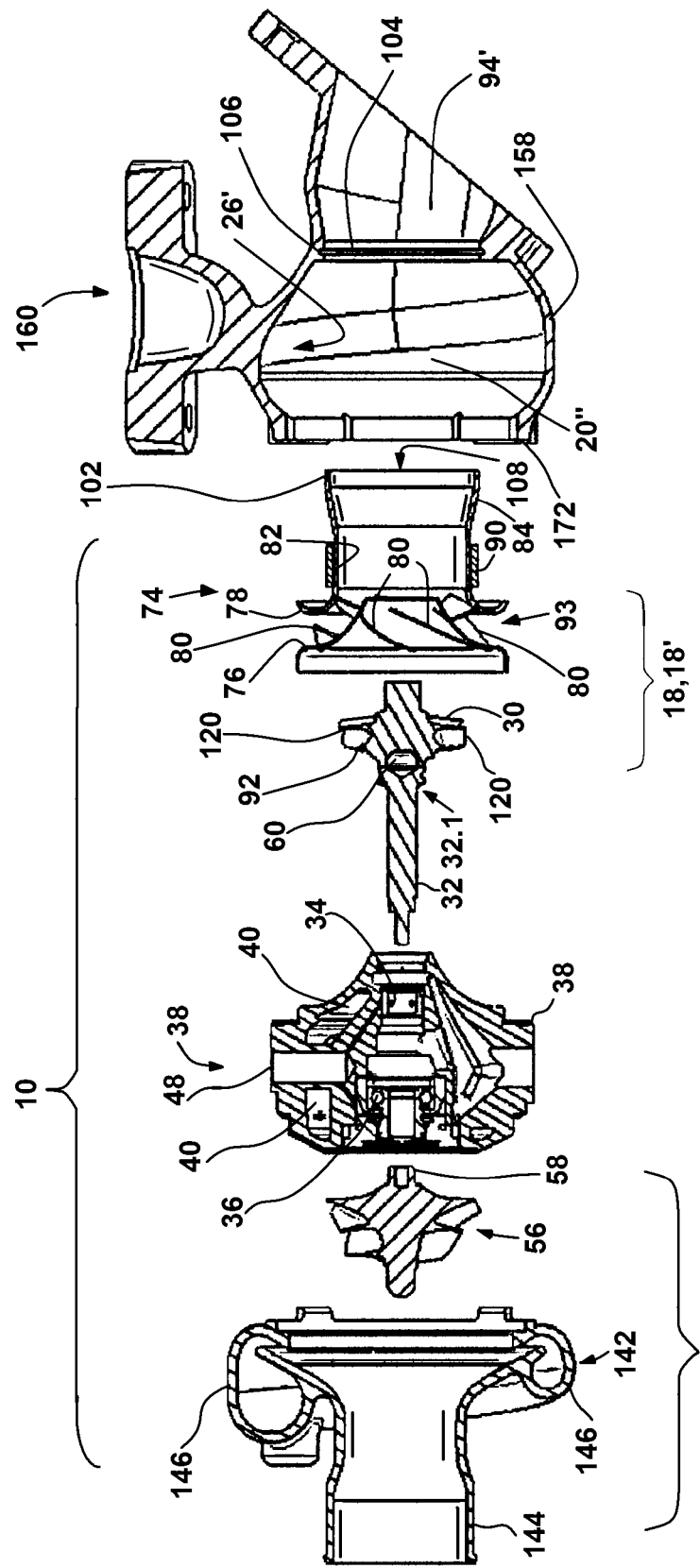
FIG. 15 illustrates a longitudinal cross-sectional exploded view of the first embodiment of the turbocharger assembly and associated housing used with the second aspect of the internal combustion engine illustrated in FIG. 13.

Referring to FIGS. 13-15, in accordance with a second aspect of an internal combustion engine and a first embodiment of an associated turbocharger assembly, the associated turbocharger core 10 cooperates with a separate turbocharger exhaust housing 158, an inlet 160 of which is operatively coupled to the exhaust manifold 162 of an internal combustion engine 14, 14.2, for example, with a plurality of bolts 164 through a first flange 166 at the outlet 168 of the exhaust manifold 162 into a second flange 170 at the inlet 160 of the turbocharger exhaust housing 158. The inlet 160 is in fluid communication with a cavity 20" in the turbocharger exhaust housing 158 via a first exhaust port 26' located so as to direct associated exhaust gases 21 off-center of the so as to induce a swirling flow of exhaust gases 21 therein. The bearing housing 38 of the turbocharger core 10, with the turbine nozzle cartridge assembly 74 attached thereto as described hereinabove, is bolted to a peripheral face 172 of the turbocharger exhaust housing 158 surrounding the cavity 20" with a plurality of bolts 174 through the bearing housing 38 and into associated threaded sockets 176 on the turbocharger exhaust housing 158 around the peripheral face 172, so that the associated turbine nozzle cartridge assembly 74 extends through the cavity 20" and into an associated second exhaust port 94' on the opposite side of the cavity 20". The second exhaust port 94' incorporates a seal ring 104 in an internal groove 106 that cooperates with the associated external sealing surface 102 on the aft end 84.1 of the nozzle exhaust portion 84 of the turbine nozzle cartridge assembly 74, so as to provide for sealing the discharge end 108 of the turbine nozzle cartridge assembly 74 to the turbocharger exhaust housing 158 so that substantially all of the exhaust gases 21 are discharged from the turbine nozzle cartridge assembly 74 into and through the second exhaust port 94 and into the associated engine exhaust system 98, thereby substantially isolating the exhaust gases 21 in the cavity 20" upstream of the turbine nozzle cartridge assembly 74 from the exhaust gases 21 discharged from the turbine nozzle cartridge assembly 74. The seal ring 104 in cooperation with the external sealing surface 102 provides for enabling discharge end 108 of the turbine nozzle cartridge assembly 74 to both slide in an axial direction and expand or contract in a radial direction, responsive to thermally-induced expansion or contraction thereof, while maintaining the sealing condition at the discharge end 108 of the turbine nozzle cartridge assembly 74, without substantial associated thermally-induced loading of the turbine nozzle cartridge assembly 74.

In operation, exhaust gases 21 from the exhaust manifold 162 flow into the inlet 160 of the turbocharger exhaust housing 158 and then into the associated cavity 20". The exhaust gases 21 swirl about the outside of the turbine nozzle cartridge assembly 74 within the cavity 20", and then flow with swirl into the peripheral inlet 93 of the turbine nozzle cartridge assembly 74 along the vanes 80 thereof, and against the turbine blades 92 of the turbine rotor 30, thereby driving the turbine rotor 30 that in turn rotates the rotor shaft 32 and the compressor rotor 56 attached thereto. The exhaust gases 21 then flow through the nozzle exhaust portion 84 of the turbine nozzle cartridge assembly 74 before being exhausted into and through the second exhaust port 94' in the turbocharger exhaust housing 158, and then into the engine exhaust system 98, which, for example, may include one or more exhaust treatment devices 100, for example, one or more catalytic converters or mufflers.

The turbocharger exhaust housing 158 could be constructed of the same type of material, for example cast iron, or alternatively, cast with a relatively-high-nickel-content alloy, as could be used for the exhaust manifold 162. As for the first aspect of an internal combustion engine, the turbocharger core 10 may be tuned to a particular engine by modifying the turbine nozzle cartridge assembly 74, independently of the design of the turbocharger exhaust housing 158 and the associated cavity 20".

Figure 16:
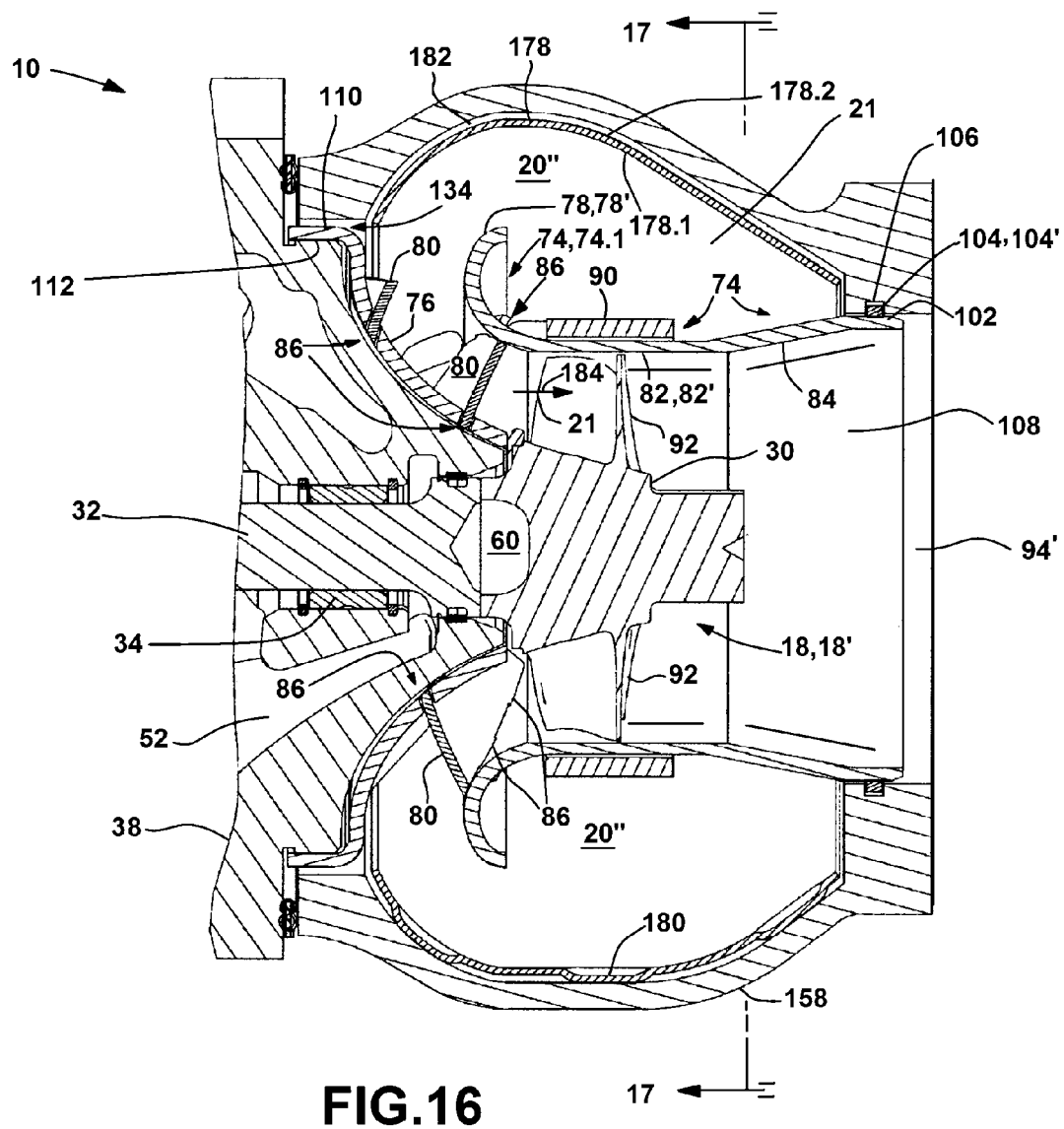
FIG. 16 illustrates a fragmentary longitudinal cross-sectional view of a second embodiment of a turbocharger assembly in accordance with the second aspect an internal combustion engine.
Figure 17:
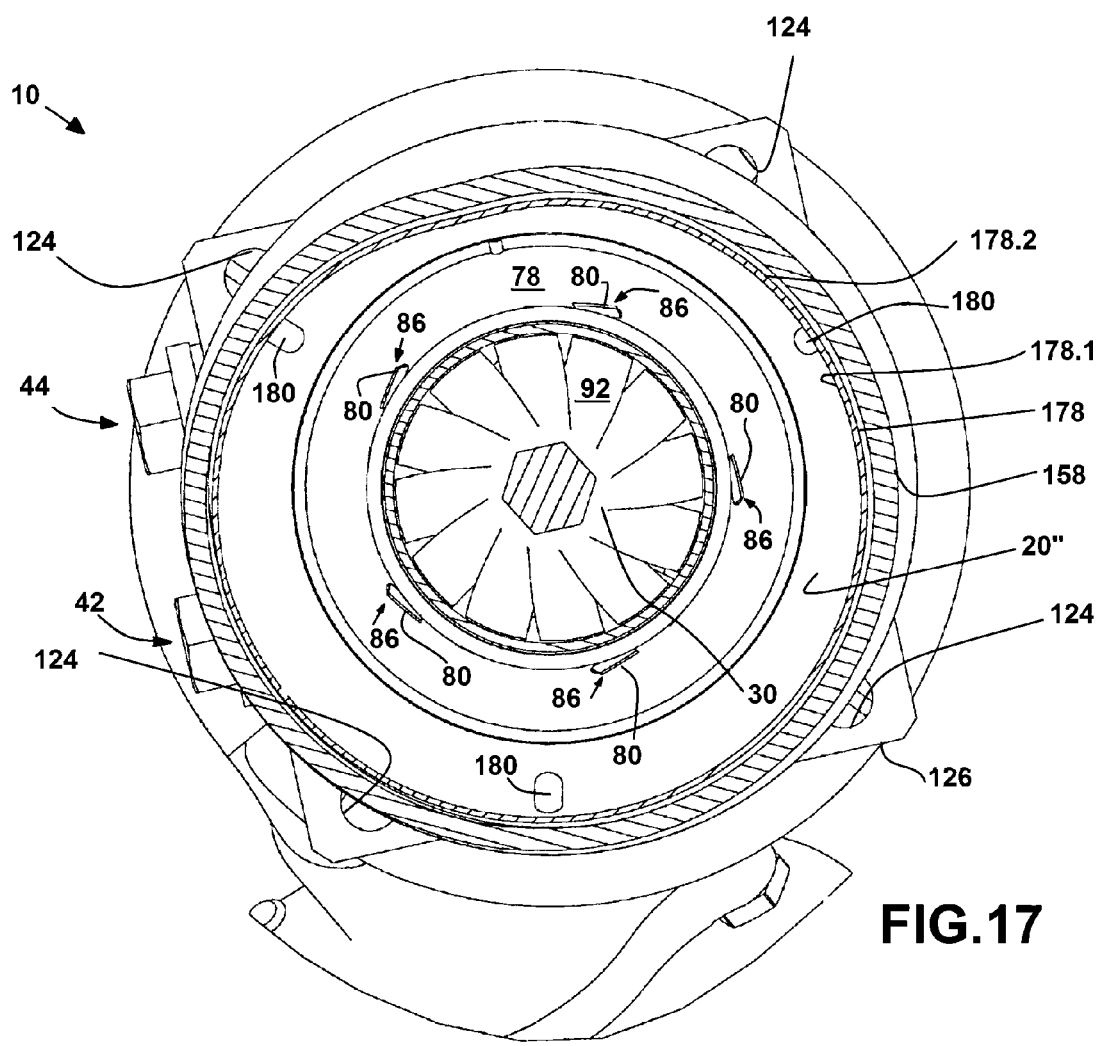
FIG. 17 illustrates a transverse cross-sectional view of the second embodiment of a turbocharger assembly illustrated in FIG. 16.

Referring to FIGS. 16 and 17, in accordance with a second embodiment of an associated turbocharger assembly adapted for use with the second aspect of an internal combustion engine 14, 14.2, the associated turbocharger exhaust housing 158 incorporates an internal heat shield 178, for example, constructed from a sheet-metal material that can withstand high temperature exhaust gases 21, for example, of a nickel alloy, for example, stainless steel with a relatively high nickel content, for example, 310 stainless steel, that provides for high temperature oxidation resistance and strength. Exhaust gases 21 within the turbocharger exhaust housing 158 are substantially contained within the inside surface 178.1 of the internal heat shield 178, the latter of which incorporates a plurality externally-protruding dimples 180 that provide for separating the outside surface 178.2 of the internal heat shield 178 from the inside surface 158.1 of the turbocharger exhaust housing 158 with an associated air gap 182 that provides for reducing conductive heat transfer from the internal heat shield 178 to the turbocharger exhaust housing 158. Accordingly, the internal heat shield 178 provides for both radiative and conductive heat shielding.

Although the internal heat shield 178 is illustrated in the context of a second aspect of the internal combustion engine 14, 14.2, i.e. external of an associated cylinder head assembly 12, an internal heat shield 178 can be particularly beneficial in the context of the first aspect the internal combustion engine 14, 14.1, i.e. integrated with an associated cylinder head assembly 12, so as to provide for substantially reducing the amount of heat transferred from the exhaust gases 21 to the cylinder head assembly 12 that would otherwise need to be removed by the associated water cooling system 46 of the internal combustion engine 14, 14.1. For example, in one simulated embodiment of the first aspect of the internal combustion engine 14, 14.1 with an associated aluminum cylinder head assembly 12 incorporating a cavity 20 having a 6 mm wall thickness and lined with a 1.5 mm thick internal heat shield 178 in cooperation with an associated turbocharger core 10, for exhaust gases 21 at 1050 degrees Celsius, the associated heat transfer was reduced from 8.20 kilowatts to 1.80 kilowatts, and the associated heat transfer coefficient was reduced from about 9 Watts per degree Kelvin to about 2 Watts per degree Kelvin, with the internal heat shield 178 operating at about 904 degrees Celsius.

The turbocharger core 10 has been illustrated hereinabove configured with an axial-flow turbine 18', wherein the exhaust gases 21 discharged from a nozzle portion 74.1 of the turbine nozzle cartridge assembly 74 are directed in a substantially axial-aftwards direction 184 aftward onto and against the turbine blades 92 of the associated axial-flow turbine 18' located aftward of the forward nozzle wall 76, vanes 80, and nozzle portion 74.1 of the turbine nozzle cartridge assembly 74.

Figure 18:
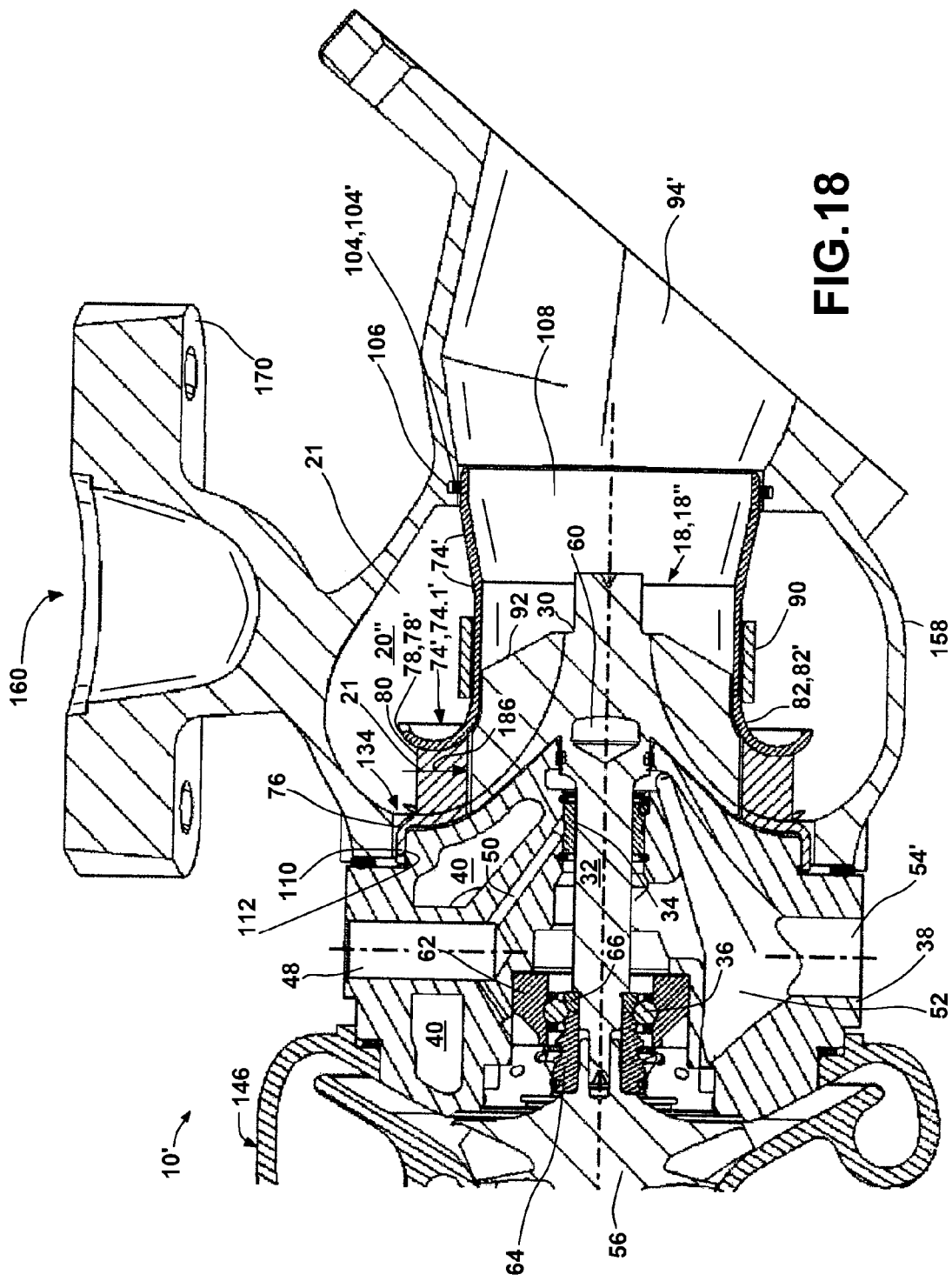
FIG. 18 illustrates a third embodiment of a turbocharger assembly incorporating a second aspect of an associated turbocharger core having an associated radial-flow turbine, in accordance with the second aspect of an internal combustion engine.

Alternatively, referring to FIG. 18, a third embodiment of a turbocharger assembly adapted in accordance with the second aspect of an internal combustion engine is illustrated incorporating a second aspect of an associated turbocharger core 10' having an associated radial-flow turbine 18" and a corresponding associated turbine nozzle cartridge assembly 74' that provides for discharging the associated exhaust gases 21 in a substantially radial-inwards direction 186 from the nozzle portion 74.1' of the turbine nozzle cartridge assembly 74 onto and against the turbine blades 92' of the associated radial-flow turbine 18' located radially inboard of the forward nozzle wall 76, vanes 80, and nozzle portion 74.1' of the turbine nozzle cartridge assembly 74'.

Furthermore, alternatively, the turbocharger core 10 may be adapted with a mixed-flow turbine, i.e. a combined radial-flow and axial-flow turbine, with an associated turbine nozzle cartridge assembly 74 adapted to cooperate therewith, but otherwise generally configured as described hereinabove, with the associated mixed-flow turbine rotor located aft and radially inboard of the forward nozzle wall 76, vanes 80, and nozzle portion 74.1 of the turbine nozzle cartridge assembly 74, with an associated conical boundary therebetween.

Furthermore, it should be understood that either the first or second aspects of the associated internal combustion engine described hereinabove may be adapted to provide for a wastegate valve 99 to provide for bypassing exhaust gases 21 from the internal combustion engine 14, 14.1, 14.2 around the turbocharger core 10, i.e. to as to enable some or all of the exhaust gases 21 to flow from the exhaust runners 24 or exhaust manifold 162 to the engine exhaust system 98 without flowing through the turbine 18.

The turbine nozzle cartridge assembly 74 provides for readily matching or tuning the turbocharger core 10 to a particular internal combustion engine 14, 14.1, 14.2, because other components of the turbocharger core 10—particularly the associated exhaust housing portion 88 of the cylinder head assembly 12 or the associated turbocharger exhaust housing 158—would not typically need to be modified during that process. Furthermore, with the turbine nozzle cartridge assembly 74 separate from and free to float relative to the associated exhaust housing portion 88 of the cylinder head assembly 12 or the associated turbocharger exhaust housing 158, production versions of the turbocharger core 10 can be adapted to work with relatively smaller clearances between the turbine tip shroud 82' and the tips 120 of the turbine blades 92 without danger of interference therebetween during the operation of the turbocharger core 10 over the life thereof.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Accordingly, the particular arrangements disclosed are meant to be illustrative only and not limiting as to the scope of the invention, which is to be given the full breadth of the appended claims, and any and all equivalents thereof.

The invention claimed is:

1. A turbocharger core adapted to cooperate with a cavity that provides for both receiving and discharging exhaust gases of an internal combustion engine, comprising:
   a. a turbocharger rotor assembly comprising:
      i. a turbine rotor;
      ii. a compressor rotor; and
      iii. a rotor shaft operatively coupling said turbine rotor to said compressor rotor, wherein said turbine rotor, said compressor rotor and said rotor shaft are operative about a common axis of rotation of said turbocharger rotor assembly;
   b. a rotor shaft support assembly comprising:
      i. a bearing housing; and
      ii. at least one bearing within said bearing housing, wherein said rotor shaft is rotationally supported by said at least one bearing along said rotor shaft, and said bearing housing is configured to mount to a forward end of said cavity so as to provide for closing said forward end of said cavity;
   c. a turbine nozzle cartridge assembly comprising:
      i. a forward nozzle wall, wherein said forward nozzle wall comprises a first surface, and said forward nozzle wall cooperates with a first aft portion of said bearing housing so as to provide for extending aftwardly therefrom;
      ii. an aft nozzle wall, wherein said aft nozzle wall comprises a second surface spaced apart aftwardly from said first surface;
      iii. a peripheral inlet of said turbine nozzle cartridge assembly located in a resulting gap between radially-peripheral portions of a forward portion of said forward nozzle wall and said aft nozzle wall;
      iv. a plurality of vanes between said forward and aft nozzle walls;
      v. a turbine rotor shroud portion aftwardly connected to or extending from said aft nozzle wall, wherein a region between said plurality of vanes and said forward and aft nozzle walls provides for fluid communication between said peripheral inlet and said turbine rotor shroud portion, said turbine rotor is located within said turbine nozzle cartridge assembly, said turbine nozzle cartridge assembly is located aft of said bearing housing;
      vi. a nozzle exhaust portion aftwardly connected to or extending from said turbine rotor shroud portion; and
      vii. an external sealing surface on an outside of an aft portion of said nozzle exhaust portion; and
   d. wherein said bearing housing incorporates a cylindrical step extending aftwardly from said bearing housing, said forward nozzle wall of said turbine nozzle cartridge assembly incoporates a cylindrical lip configured to cooperate with said cylindrical step, an inside diameter of said cylindrical lip and a corresponding outside diameter of said cylindrical step are configured so as to provide for an interference fit at room temperature, while also providing for thermally induced expansion of said cylindrical lip relative to said cylindrical step, further comprising a plurality of radial pins through a corresponding plurality of radial holes in said cylindrical lip of said forward nozzle wall and into said cylindrical step for retaining and substantially centering said turbine nozzle cartridge assembly concentric relative to said bearing housing and relative to said common axis of rotation of said turbocharger rotor assembly.

2. A turbocharger core as recited in claim 1, wherein said turbine rotor comprises an axial-flow turbine rotor located aft of said forward nozzle wall and aft of said plurality of vanes and operative within said turbine rotor shroud portion of said turbine nozzle cartridge assembly.

3. A turbocharger core as recited in claim 1, wherein said turbine rotor comprises a radial-flow turbine rotor located radially inboard of said forward nozzle wall and radially inboard of said plurality of vanes and operative within said turbine rotor shroud portion of said turbine nozzle cartridge assembly.

4. A turbocharger core as recited in claim 1, wherein said turbine rotor comprises a mixed-flow turbine rotor located aft and radially inboard of said forward nozzle wall and aft and radially inboard of said plurality of vanes and operative within said turbine rotor shroud portion of said turbine nozzle cartridge assembly.

5. A turbocharger core as recited in claim 1, wherein said compressor rotor comprises a radial flow compressor rotor.

6. A turbocharger core as recited in claim 1, wherein said compressor rotor comprises a boreless hub compressor rotor comprising an aftwardly extending internally threaded boss that cooperates with a threaded portion of a forward end of said rotor shaft.

7. A turbocharger core as recited in claim 1, further comprising a compressor housing surrounding said compressor rotor, wherein said compressor housing comprises:
   a. a central inlet forward of said compressor rotor; and
   b. a volute diffuser radially outboard of said compressor rotor.

8. A turbocharger core as recited in claim 1, wherein said plurality of radial holes are symmetrically located around said cylindrical step.

9. A turbocharger core as recited in claims 1, further comprising an adapter bushing located between said bearing housing and said forward sealing surface at said forward end of said cavity, wherein said adapter bushing surrounds said cylindrical lip of said forward nozzle wall with sufficient clearance so as to provide for uninhibited thermally-induced radial expansion of said cylindrical lip during operation of the turbocharger core within the cavity responsive to the exhaust gases of the internal combustion engine, and said adapter bushing provides for capturing said plurality of radial pins within a corresponding plurality of radial holes in said cylindrical step.

10. A turbocharger core as recited in claim 9, wherein an aft surface of said adapter bushing is located and fillet-shaped so as to provide for a substantially continuous transition from an interior wall of said cavity to said forward nozzle wall of said turbine nozzle cartridge assembly.

11. A turbocharger core as recited in claim 1, wherein said at least one bearing comprises:
   a. a forward rolling element bearing within a forward portion of said bearing housing; and
   b. an aft journal bearing within a second aft portion of said bearing housing.

12. A turbocharger core as recited in claim 11, further comprising a lubrication system within said bearing housing comprising:
   a. an oil inlet port;
   b. at least one oil distribution passage in fluid communication with said oil inlet port, wherein said at least one oil distribution passage provides for distributing oil from said oil inlet port to both said forward rolling element bearing and to said aft journal bearing;
   c. an oil scavenge cavity that provides for receiving said oil distributed by said at least one oil distribution passage to said forward rolling element bearing and to said aft journal bearing; and
   d. an oil scavenge port configured to return said oil from said oil scavenge cavity to an external oil supply.

13. A turbocharger core as recited in claim 1, further comprising a cooling subsystem within said bearing housing comprising:
   a. a cooling jacket;
   b. a cooling inlet port on said bearing housing in fluid communication with said cooling jacket; and
   c. a cooling outlet port on said bearing housing in fluid communication with said cooling jacket, wherein said cooling jacket provides for cooling said at least one bearing responsive to a flow of coolant from said cooling inlet port into said cooling jacket and out of said cooling outlet port.

14. A turbocharger core as recited in claim 1, wherein said turbocharger core is incorporated in a turbocharger assembly further comprising:
   a. said cavity, wherein said cavity is integral with at least one exhaust conduit portion of said internal combustion engine;
   b. a first exhaust port extending through a side wall of said cavity, wherein a centerline of said first exhaust port is located radially outwards of an axis of rotation of said turbocharger rotor assembly when assembled in said cavity relative to said common axis of rotation;
   c. a second exhaust port extending through an aft end wall of said cavity, wherein said second exhaust port provides for in fluid communication with an exhaust system of the internal combustion engine, and an outlet of said nozzle exhaust portion is in fluid communication with said second exhaust port through said aft end wall of said cavity; and
   d. a sealing element within or proximate to an aft portion of said cavity, wherein said sealing element cooperates with said external sealing surface of said turbine nozzle cartridge assembly so as to provide for maintaining an at least partially sealed condition therebetween that is substantially unaffected by thermally-induced expansion or contraction of said turbine nozzle cartridge assembly during operation of said turbocharger assembly, wherein said sealed condition provides for substantially inhibiting direct fluid communication from said cavity to said second exhaust port without first passing through said turbine rotor shroud portion of said turbine nozzle cartridge assembly.

15. A turbocharger core incorporated in a turbocharger as recited in claim 14, wherein said at least one exhaust conduit portion of the internal combustion engine comprises an exhaust manifold portion of the internal combustion engine, and said first exhaust port is directly coupled to an outlet of said exhaust manifold portion of the internal combustion engine.

16. A turbocharger core incorporated in a turbocharger as recited in claim 15, wherein said exhaust manifold portion of the internal combustion engine is integral with a corresponding cylinder head portion of the internal combustion engine.

17. A turbocharger core incorporated in a turbocharger as recited in claim 16, wherein said cavity is in heat transfer relationship with at least one cooling water passage of the internal combustion engine.

18. A turbocharger core incorporated in a turbocharger as recited in claim 17, further comprising a heat shield liner within at least a substantial portion of said cavity.

19. A turbocharger core incorporated in a turbocharger as recited in claim 18, wherein said heat shield liner is constructed of sheet metal comprising a plurality of standoff dimples that provide for separating a substantial portion of said heat shield liner from an internal surface of said cavity.

20. A turbocharger core incorporated in a turbocharger as recited in claim 15, wherein said exhaust manifold portion of the internal combustion engine is separate from and attachable to a corresponding cylinder head portion of the internal combustion engine.

21. A turbocharger core incorporated in a turbocharger as recited in claim 14, wherein said first exhaust port is directly coupled within a cylinder head assembly of the internal combustion engine to one or more exhaust runners from a corresponding one or more cylinders of the internal combustion engine.

22. A turbocharger core incorporated in a turbocharger as recited in claim 14, wherein a region within said cavity external of at least one of said turbine rotor shroud portion or said nozzle exhaust portion of said turbine nozzle cartridge assembly comprises a volute shape that is operative from said first exhaust port to said peripheral inlet of said turbine nozzle cartridge assembly.

23. A turbocharger core incorporated in a turbocharger as recited in claim 14, further comprising a counterbore within said cavity proximate to said aft end wall thereof, wherein said sealing element comprises a sealing ring around at least a portion of said external sealing surface on said aft portion of said nozzle exhaust portion, and said sealing ring cooperates with an internal groove within said counterbore.

24. A turbocharger core as recited in claim 1, wherein said first surface of said forward nozzle wall comprises a first curved swept surface and said second surface of said aft nozzle wall comprises a second curved swept surface.

25. A turbocharger core as recited in claim 24, wherein said first curved swept surface comprises a first surface of revolution and said second curved swept surface comprises a second surface of revolution.

26. A turbocharger core as recited in claim 25, wherein said first and second surfaces of revolution are substantially concentric with one another.

27. A turbine nozzle cartridge assembly adapted to cooperate with a turbine rotor of an associated turbocharger core, comprising:
   a. a forward nozzle wall, wherein said forward nozzle wall comprises:
      i. a first surface; and
      ii. a cylindrical lip located at a forward end of said first surface, wherein said cylindrical lip is configured to fit over a corresponding cylindrical step extending aftwardly from an associated bearing housing of the turbocharger core, said cylindrical lip incorporates a plurality of radial holes, and said plurality of radial holes are configured to cooperate with a corresponding plurality of radial pins extending radially outward from said cylindrical step, so as to provide for maintaining a concentricity of said turbine nozzle cartridge assembly with respect to said bearing housing when said cylindrical lip is thermally expanded with respect to said cylindrical step;

b. an aft nozzle wall, wherein said aft nozzle wall comprises a second surface spaced apart aftwardly from said first surface;

c. a peripheral inlet to said turbine nozzle cartridge assembly located in a resulting gap between radially-peripheral portions of a forward portion of said forward nozzle wall and said aft nozzle wall;

d. a plurality of vanes between said forward and aft nozzle walls;

e. a turbine rotor shroud portion aftwardly connected to or extending from said aft nozzle wall, wherein a region between said plurality of vanes and said forward and aft nozzle walls provides for fluid communication between said peripheral inlet and said turbine rotor shroud portion, said turbine rotor shroud portion provides for receiving therewithin at least a portion of the turbine rotor of the associated turbocharger core;

f. a nozzle exhaust portion aftwardly connected to or extending from said turbine rotor shroud portion; and g. an external sealing surface on an outside of an aft portion of said nozzle exhaust portion, wherein said external sealing surface is configured to cooperate with a corresponding sealing element so as to provide for maintaining a sealed condition therebetween that is substantially unaffected by thermally-induced expansion or contraction of said turbine nozzle cartridge assembly during operation thereof.

28. A turbine nozzle cartridge assembly as recited in claim 27, wherein said forward nozzle wall comprises a first curved swept surface, and said forward portion of said aft nozzle wall comprises a second curved swept surface.

29. A turbine nozzle cartridge assembly as recited in claim 27, wherein said turbine nozzle cartridge assembly is formed from sheet metal, and said plurality of vanes are constructed of sheet metal with portions thereof extending through corresponding slots in said forward nozzle wall and said forward portion of said aft nozzle wall.

30. A turbine nozzle cartridge assembly as recited in claim 27, wherein said turbine rotor shroud portion is reinforced with a containment sleeve.

31. A turbine nozzle cartridge assembly as recited in claim 27, wherein said first surface of said forward nozzle wall comprises a first curved swept surface and said second surface of said aft nozzle wall comprises a second curved swept surface.

32. A turbine nozzle cartridge assembly as recited in claim 31, wherein said first curved swept surface comprises a first surface of revolution and said second curved swept surface comprises a second surface of revolution.

33. A turbine nozzle cartridge assembly as recited in claim 32, wherein said first and second surfaces of revolution are substantially concentric with one another.

* * * * *

UNITED STATES PATENT AND TRADEMARK OFFICE
CERTIFICATE OF CORRECTION

| | | |
|---|---|---|
| PATENT NO. | : 8,418,458 B2 | Page 1 of 1 |
| APPLICATION NO. | : 12/690767 | |
| DATED | : April 16, 2013 | |
| INVENTOR(S) | : Thomas J. Williams and Mark E. Suchezky | |

It is certified that error appears in the above-identified patent and that said Letters Patent is hereby corrected as shown below:

Title Page 2,
    last line of OTHER PUBLICATIONS,
        "0343925" should be changed to --0433925--.

In the Specification
Column 3:
    Line 59, "that that" should be changed to --that--.
Column 6:
    Line 41, "of the of the" should be changed to --of the--; and
    Line 44, "greater that" should be changed to --greater than--.

In the Claims
Column 12:
    Claim 1:
        Line 4, "incoporates" should be changed to --incorporates--; and
        Line 14, "for retaining" should be changed to --so as to provide for retaining--; and
    Claim 9:
        Line 51, "claims" should be changed to --claim--; and
        Line 53, "said forward sealing surface" should be changed to --a forward sealing surface--.

Signed and Sealed this
Twelfth Day of May, 2015

Michelle K. Lee
*Director of the United States Patent and Trademark Office*